(12) United States Patent
Samid

(10) Patent No.: US 11,107,156 B2
(45) Date of Patent: Aug. 31, 2021

(54) DIGITAL FINANCE: CASH, CREDIT, AND INVESTMENT INSTRUMENTS IN A UNIFIED FRAMEWORK (BITMINT)

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/363,789

(22) Filed: Mar. 25, 2019

(65) Prior Publication Data

US 2019/0295159 A1    Sep. 26, 2019

Related U.S. Application Data

(60) Provisional application No. 62/813,281, filed on Mar. 4, 2019, provisional application No. 62/805,369, filed
(Continued)

(51) Int. Cl.
*G06Q 40/02* (2012.01)
*G06Q 20/06* (2012.01)

(52) U.S. Cl.
CPC ......... *G06Q 40/02* (2013.01); *G06Q 20/0655* (2013.01)

(58) Field of Classification Search
CPC ........ G06Q 40/02; G06Q 40/00; G06Q 20/10; G06Q 20/102; G06Q 20/0655; G06Q 30/02; G06Q 40/04; G06Q 30/04; G06Q 30/06
(Continued)

(56) References Cited

U.S. PATENT DOCUMENTS

2008/0262969 A1* 10/2008 Samid .................... G06Q 20/04
705/64
2013/0311348 A1* 11/2013 Samid .................... G06Q 40/00
705/37
(Continued)

OTHER PUBLICATIONS

Li, J. (2014). The tessera D&R computational environment: Designed experiments for R-hadoop performance and bitcoin analysis. Available from ProQuest. Retrieved from https://dialog.proquest.com/professional/docview/1673895283?accountid=131444. (Year: 2014).*

*Primary Examiner* — Hani M Kazimi

(57) ABSTRACT

Presenting a framework for digital finance based on the notion of a unified digital expression to value and identity which carries this value—advancing beyond the standard form of digital finance where value (a number) is expressed without any coin, or bill identity. The solution is based on ordered financial bits (fbits) which may be comprised of ingredient fbits, or of elemental fbits which are qbits—real or simulated. As such this solution (BitMint) is ready for quantum computing when it materializes commercially. A BitMinted entity carries its terms of exchange, and redemption; it may carry its transactional history, and apply equally to cash, credit and investment instruments. It allows full operational flexibility to its controllers who mint and redeem it. The BitMinted entity, BitMint "coin", or simply "coin" will keep transacting even if the Internet is slow, or jammed. The coin may be cut to any small denomination desired, or lumped to any large sum of interest. It spans from international payments, to Internet-of-Things value exchange. The BitMint coin will flip at will from transactional privacy to transactional transparency, and back. Designed as a national currency framework, the BitMint coin lends itself to fair, efficient and transparent taxation. BitMint is the mathematically optimized solution to the objective of combining identity and value into a non-separable value carrier (coin).

4 Claims, 18 Drawing Sheets

Mutual Service: BitMint Payment Accounting

Meta Data Logs Coin Custody Chain

Related U.S. Application Data on Feb. 14, 2019, provisional application No. 62/782,301, filed on Dec. 19, 2018, provisional application No. 62/714,735, filed on Aug. 5, 2018, provisional application No. 62/689,890, filed on Jun. 26, 2018, provisional application No. 62/688,387, filed on Jun. 22, 2018, provisional application No. 62/671,421, filed on May 15, 2018, provisional application No. 62/647,760, filed on Mar. 25, 2018.

(58) Field of Classification Search
USPC .................................................. 705/35–42
See application file for complete search history.

(56) References Cited

U.S. PATENT DOCUMENTS

| | | | | |
|---|---|---|---|---|
| 2014/0279551 A1* | 9/2014 | Samid | .................. | G06Q 20/065 705/64 |
| 2015/0088721 A1* | 3/2015 | Samid | .................... | G06Q 40/04 705/37 |
| 2015/0302399 A1* | 10/2015 | Meister | .............. | G06Q 20/3823 705/69 |
| 2017/0039556 A1* | 2/2017 | Samid | ................ | G06Q 20/3825 |
| 2017/0053249 A1* | 2/2017 | Tunnell | ................ | G06Q 20/382 |
| 2017/0200232 A1* | 7/2017 | Samid | .................... | G06Q 40/06 |
| 2018/0268382 A1* | 9/2018 | Wasserman | ........ | G06Q 20/0655 |
| 2020/0033834 A1* | 1/2020 | Samid | ....................... | H04L 9/30 |

* cited by examiner

BitMint Payment Configuration: Valuation Function Holder and Coin Holder

Mutual Service: BitMint Payment Accounting

*Meta Data Logs Coin Custody Chain*

Superposition of BitMint Valuation Functions

**BitMint Coin Superpositioned
with Positive and Negative Values**

**BitMint Coin Superpositioned
with Positive, Zero and Negative Values**

Credit and Cash Cascade

Fig.-8
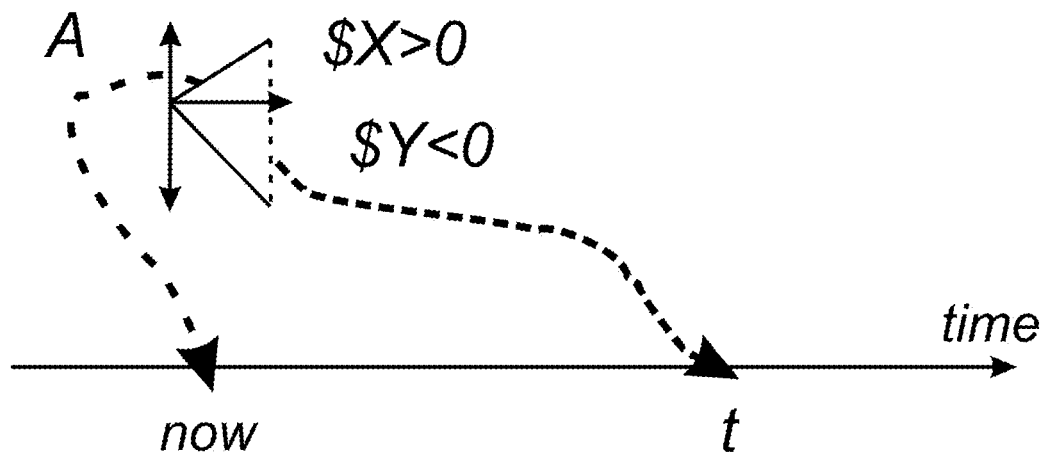
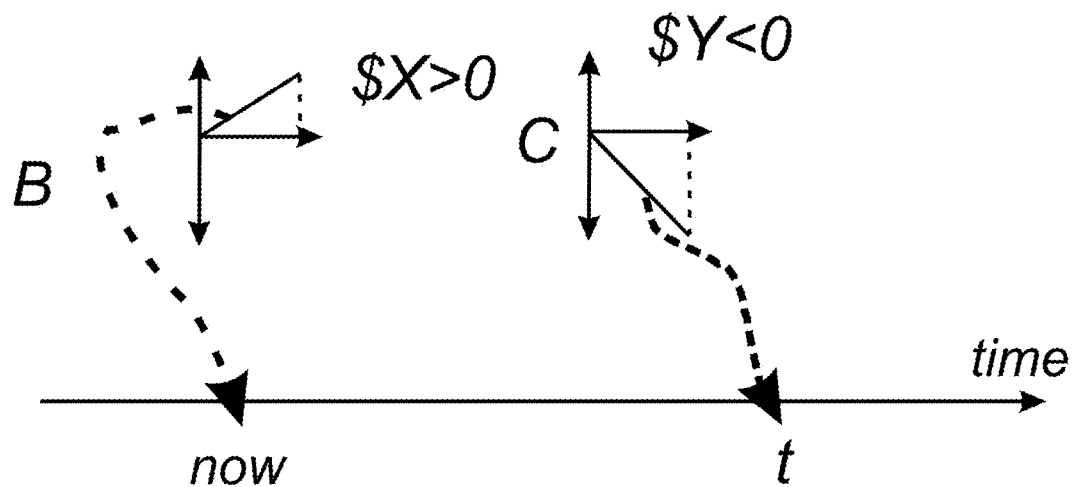
Coin Exchange: Double Valuation to Single Valuation

Positive and Negative Valuation Exchange

Prescription Drug User Authenticates Her Pills Marked with an Entropic Alphabet

Drug Authentication

Nurse Verifies Patient's Pills (and pays for them) via Patient's Phone

Patient pays for daily pills and gets them

Pay-Per-Pill Helps Patients Take their Prescription Drugs on Time

Fig.-14:
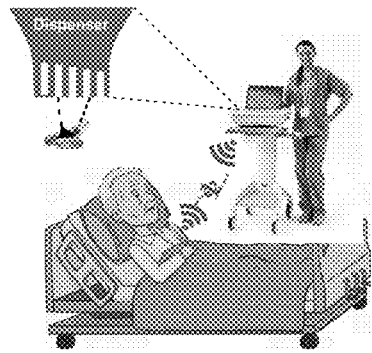
Patient pays-per-pill,
Nurses saves work, reduces errors
Fig.-15 qbit – real and simulated
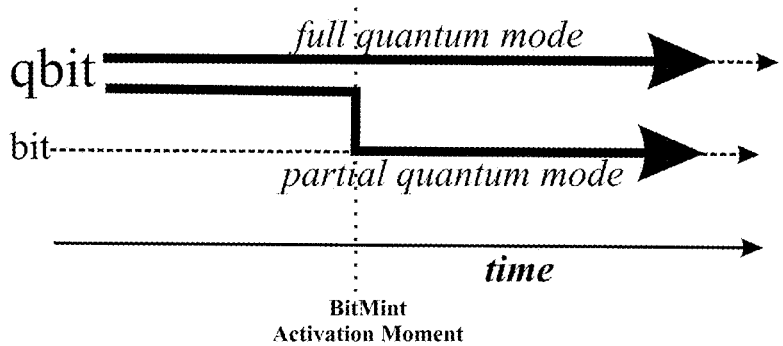
Fig.16
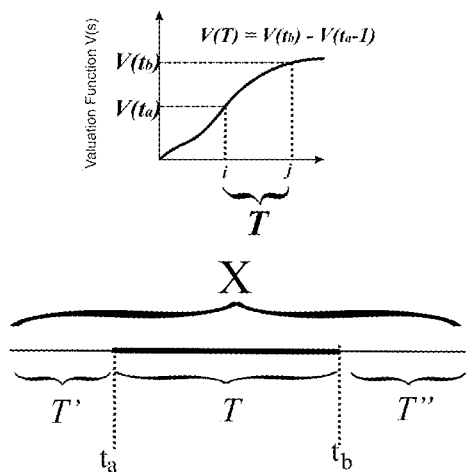
$V(X) = V(T') + V(T) + V(T'')$
Splitting a BitMint Coin

Fig.-17: anatomy of an fbit
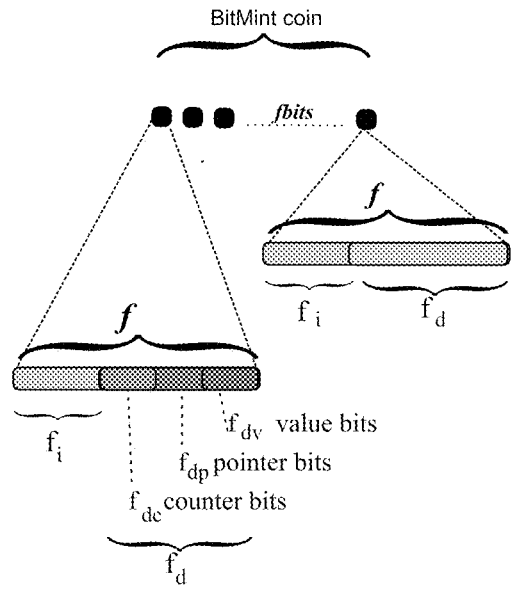
Fig.-18
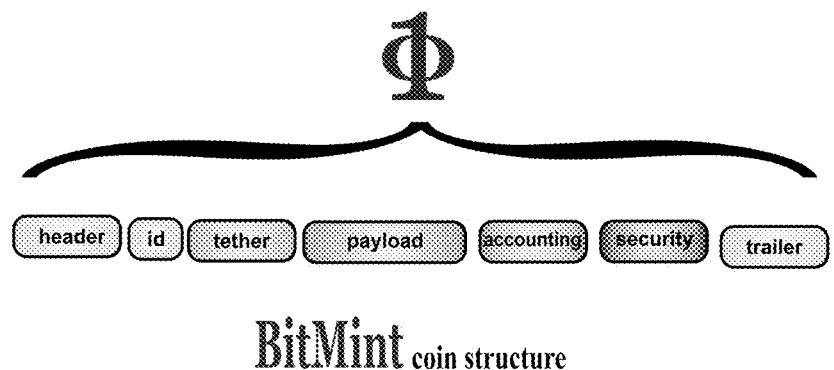
Fig.19: BitMint Redemption dynamics:
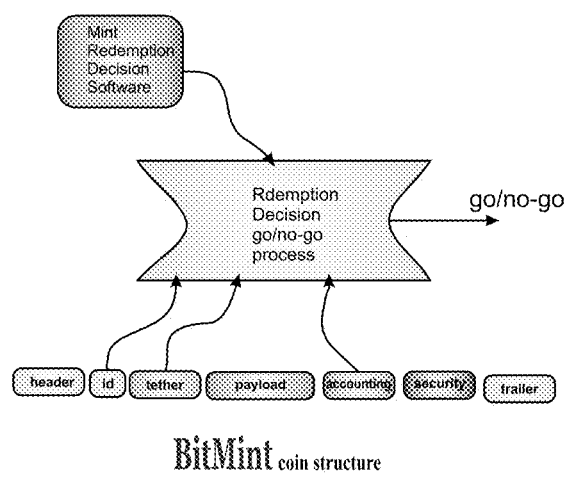

Fig.-20: owner identification options
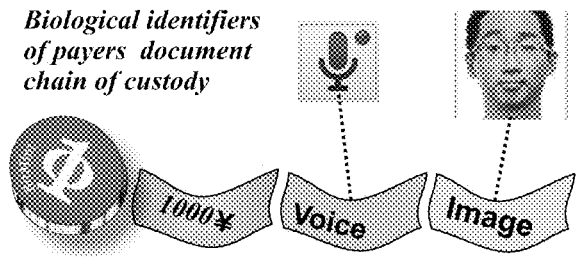
The BitMint Coin Carries its Own History
Fig.-21: coin custodian history
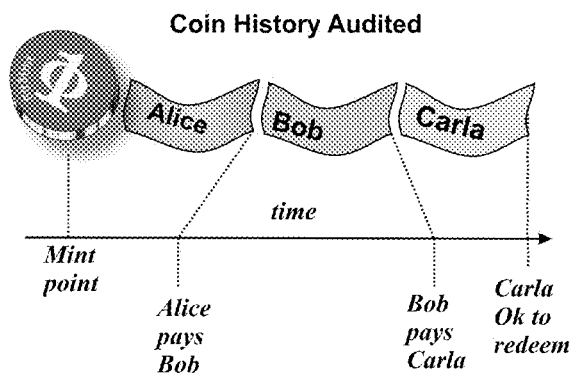
Fig.-22:
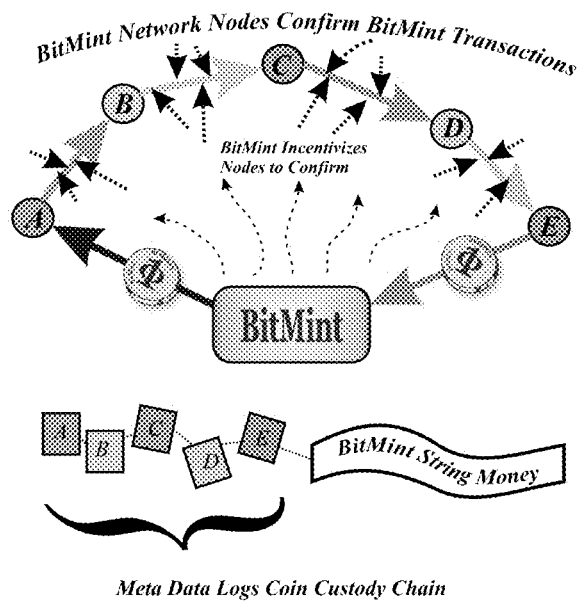
Trader A buys a BitMint digital coin, passes the coin to trader B; B passes to trader C, then to D and E. E redeems the coin with BitMint.

Fig.-23 layered security for coin history
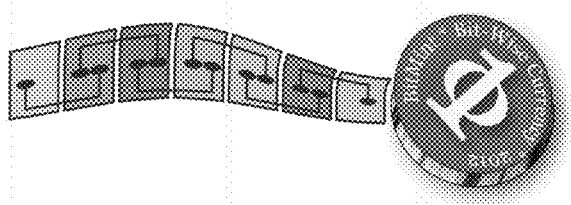
Fig-24: Tracking BitMint Split Coins
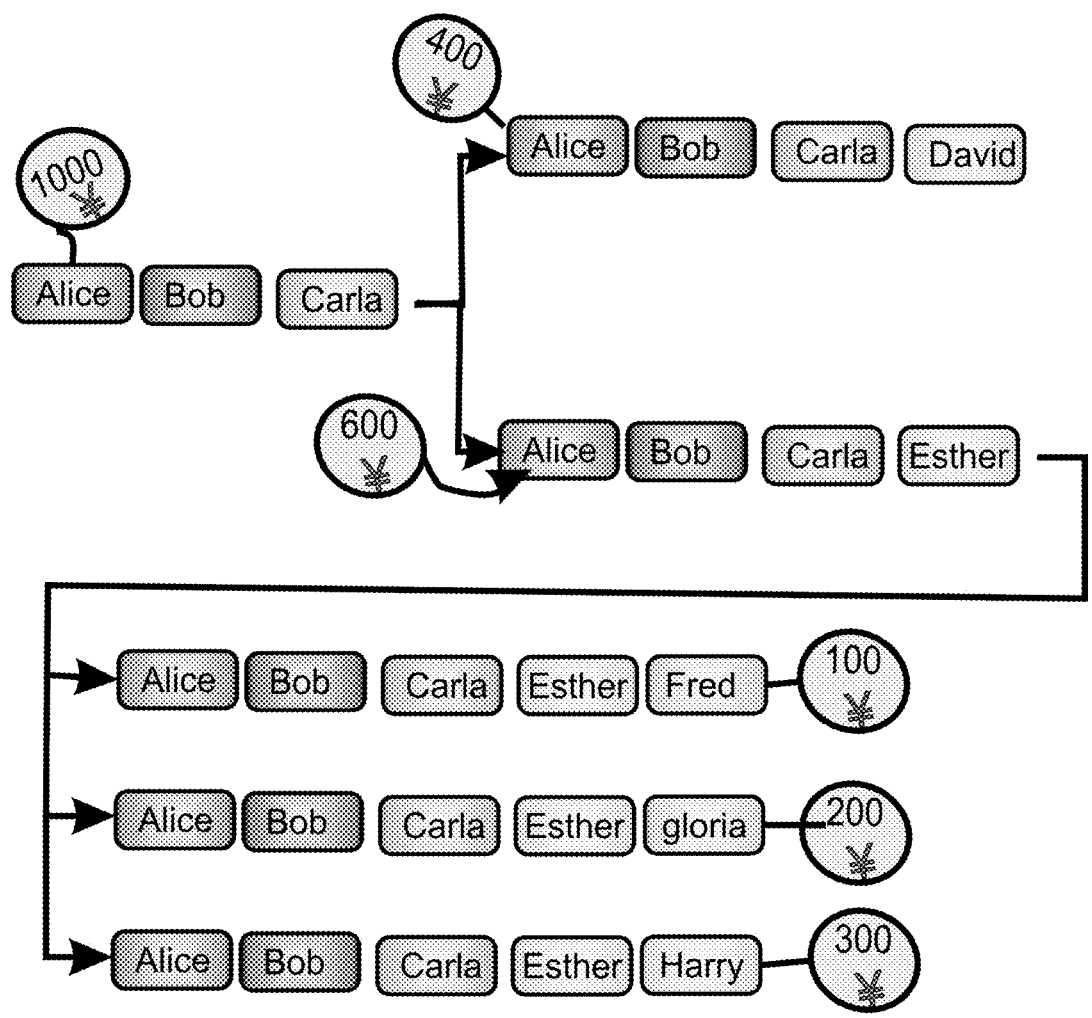
Tracking BitMint Split Coins Fig.-25: frictionless payment:
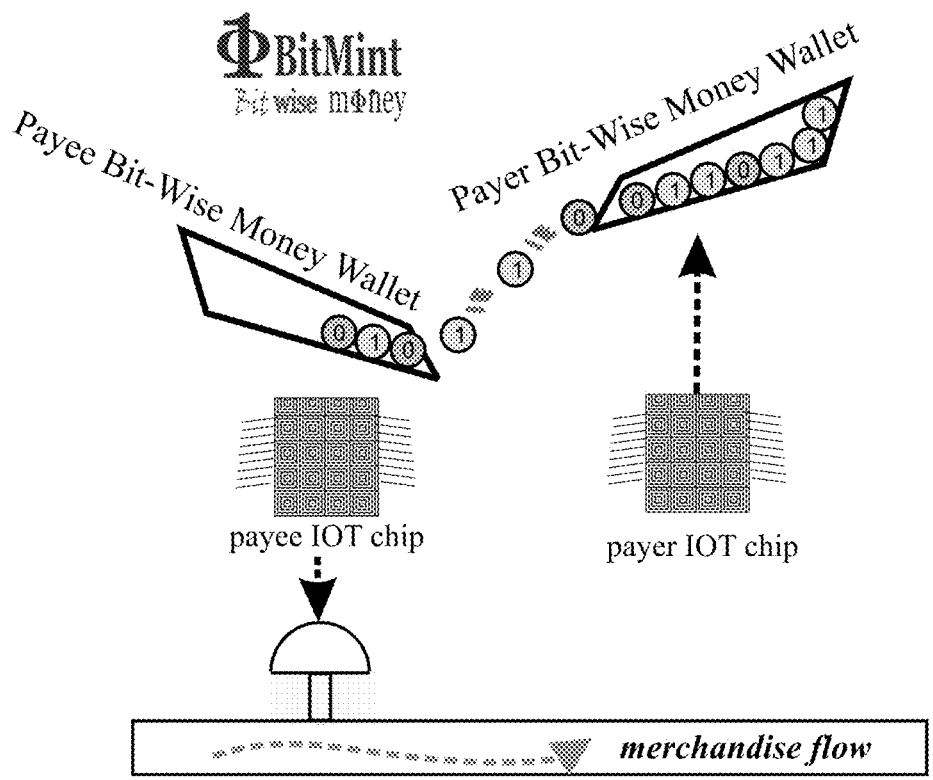
Counterflow Mode: if merchandise stops flowing, money stops right away. If money stops – merchandise stops.
No more account adjustment dialogues, no invoices, no late payment!

Fig-26: time dynamics of coin authentication
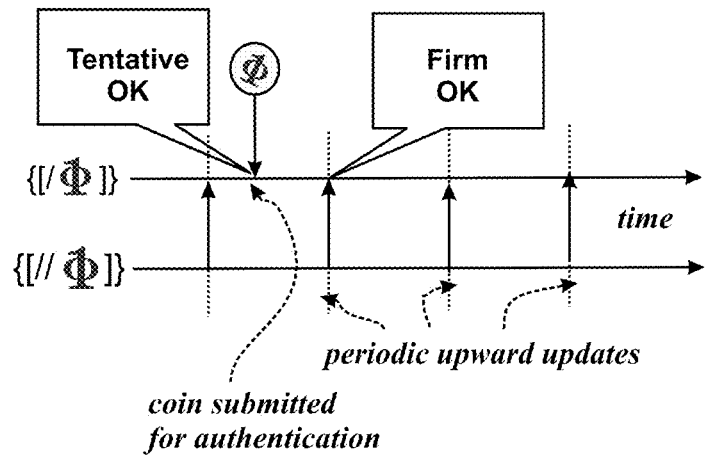
Fig.-27:
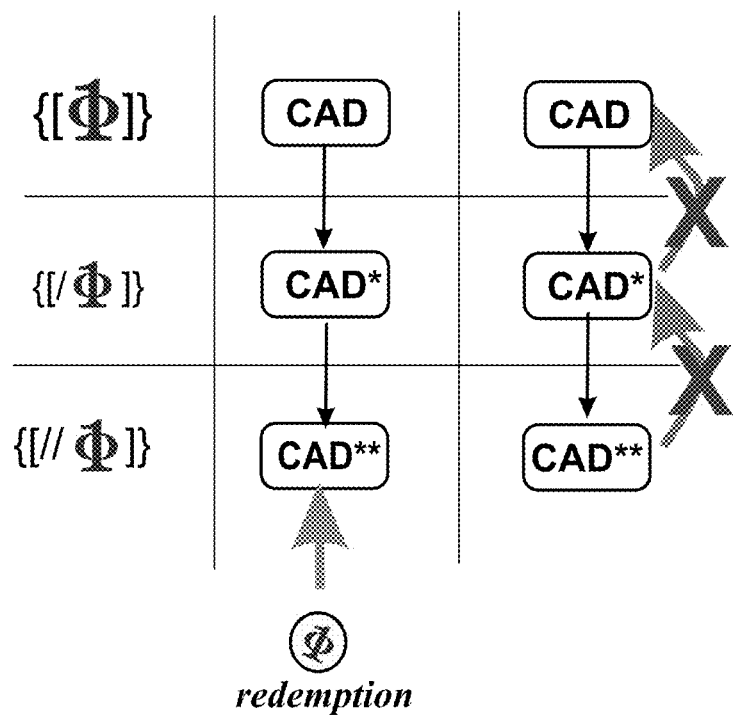

Fig.-28 dynamic comparison between cash and BitMint coin
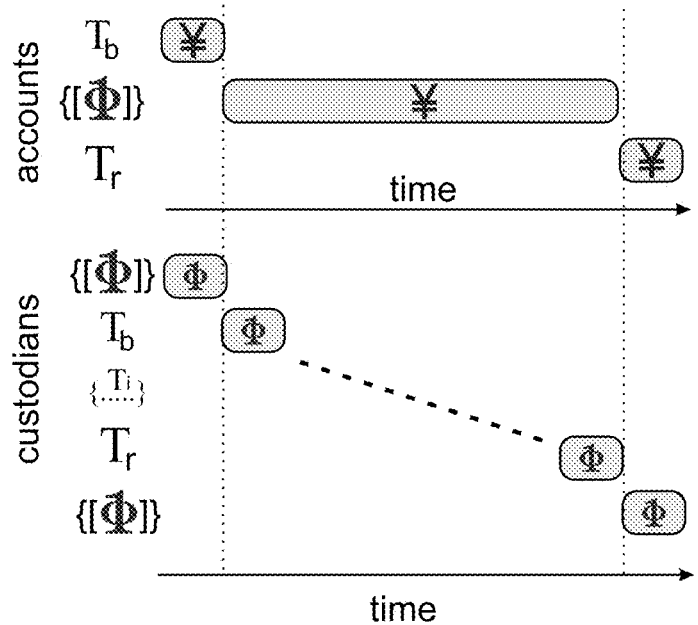
Fig-29: f-split and v-split of BitMint coin
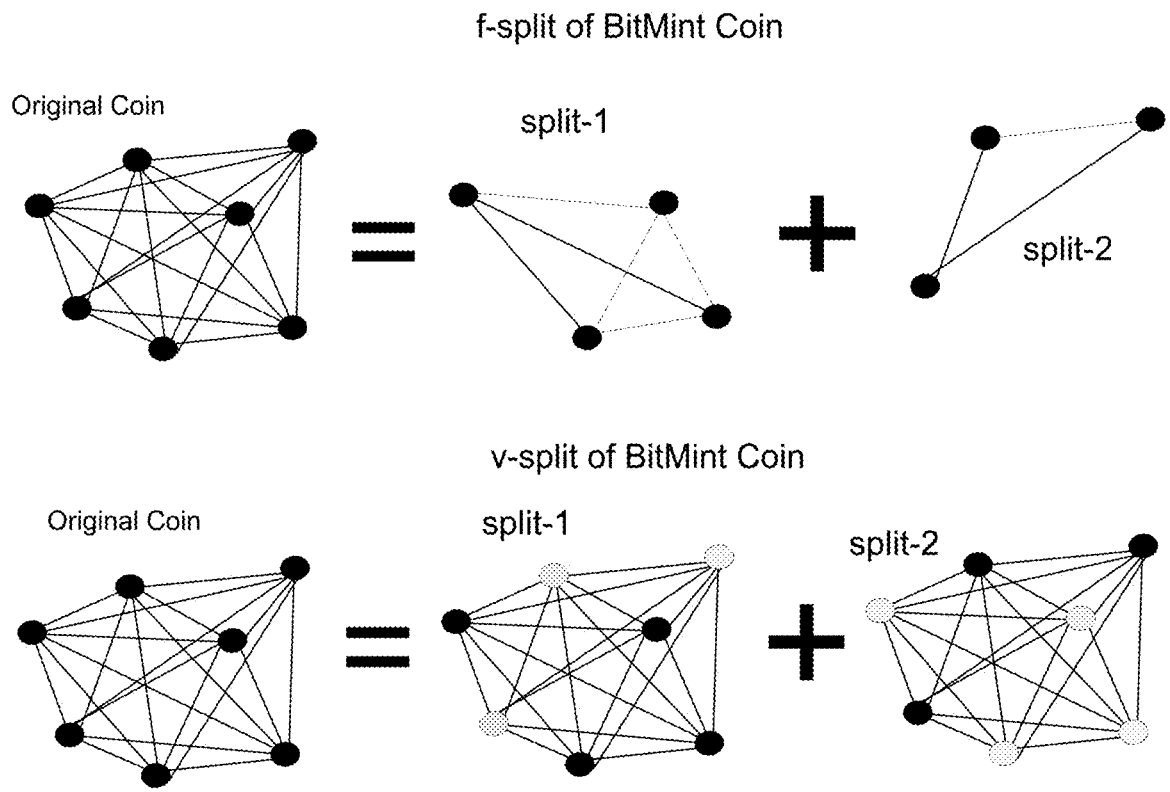

Fig.30 Joining of BitMint Coins
Joining of BitMint Coins
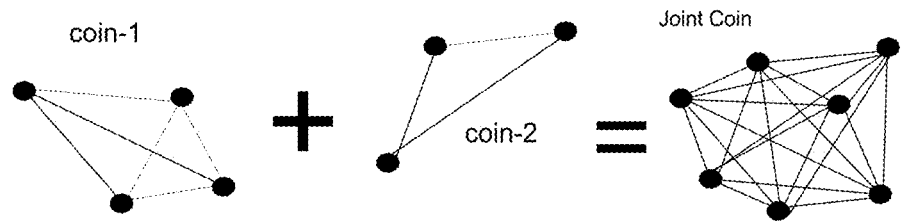
Joining V-split BitMint Coins
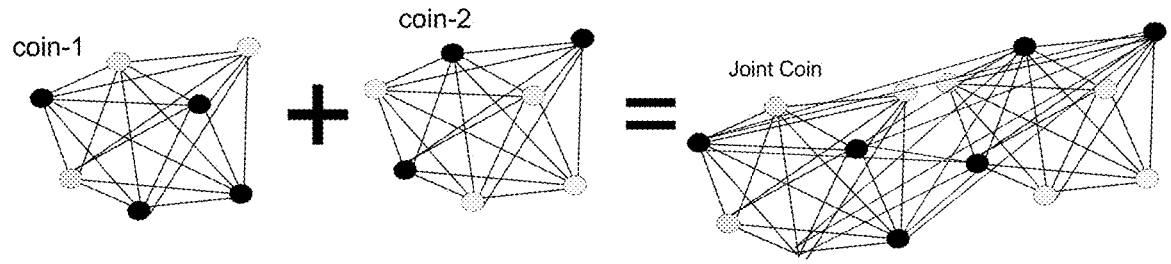

DIGITAL FINANCE: CASH, CREDIT, AND INVESTMENT INSTRUMENTS IN A UNIFIED FRAMEWORK (BITMINT)

BRIEF SUMMARY OF THE INVENTION

Presenting a framework for digital finance based on the notion of a unified digital expression to value and identity which carries this value—advancing beyond the standard form of digital finance where value (a number) is expressed without any coin, or bill identity. The solution is based on ordered financial bits (fbits) which may be comprised of ingredient fbits, or of elemental fbits which are qbits—real or simulated. As such this solution (BitMint) is ready for quantum computing when it materializes commercially. A BitMinted entity carries its terms of exchange, and redemption; it may carry its transactional history, and apply equally to cash, credit and investment instruments. It allows full operational flexibility to its controllers who mint and redeem it. The BitMinted entity, BitMint "coin", or simply "coin" will keep transacting even if the Internet is slow, or jammed. The coin may be cut to any small denomination desired, or lumped to any large sum of interest. It spans from international payments, to Internet-of-Things value exchange. It may be expressed off the hackable bit-grid as a chemical composite coin where the value is expressed via chemical connections. The BitMint coin will flip at will from transactional privacy to transactional transparency, and back. Designed as a national currency framework, the BitMint coin lends itself to fair, efficient and transparent taxation. Unlike the common crypto currencies BitMint is not vulnerable to computer more powerful than its minting machine, and it is not vulnerable to a mathematician smarter than its designer. BitMint is the mathematically optimized solution to the objective of combining identity and value into a non-separable value carrier (coin).

CROSS REFERENCE TO RELATED APPLICATIONS

This application claims as priority date of: Provisional Application #62647760 filed on Mar. 25, 2018; Provisional Application No. 62/671,421 filed on May 15, 2018; Provisional Application No. 62/688,387 filed on Jun. 22, 2018; Provisional Application No. 62/689,890 filed on Jun. 26, 2018;Provisional Application #62714735 filed on Aug. 5, 2018; Provisional Applications No. 62/805,369 filed on Feb. 14, 2019; Provisional Application No. 62/813,281filed on Mar. 4, 2019; Provisional Application No. 62/782,301 filed on Dec. 19, 2018.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

People's life and activities are in a wide sweeping migration towards cyberspace. Money and finance are the bloodline for societal activity, and hence the world of finance must be re-established on a framework that is consistent with modern times. Legacy banking, and even central banks have been subjected to mounting pressures from digital banking and crypto currencies. Credit and Investment go increasingly digital and governed by artificial intelligence. A technological revolution is happening, and within the myriad of solution ideas, a few should emerge as a durable financial platform to serve society on a wide span of utilities. A design goal emerges: a digital solution to modern finance that would fit cash, consumer payment, business-to-business, Internet-of-Things, automated payment, credit management, investment, taxation, risk allocation, and national and international payment, as well as central banking on a unified formal protocol. The solution presented here, BitMint (inclusive) coin is a contender for such a solution.

Our fast technological pace poses a risk of obsolescence to any digital money design wedded to the present. Req #1: Digital Money Today Should Anticipate Quantum Computing Tomorrow. And until then we should build a digital financial framework based on bits to be transformed into qbits.

We Must Design Digital Money as a Comprehensive Platform for all things financial Req #2: Cash, Credit, and All Financial Instruments Should fit into the Same Format. Much as the chemical elements in the Periodic Table fit into the same atomic framework, allowing for chemical bonds—so should financial elements interact The newly designed digital money should incorporate a rich toolbox for central banks to intervene and take steps to insure economic stability. Req #3: Digital Money Should Enable its Controllers to use Money to Best Serve Society. Inflation, deflation, employment, should be manageable.

Unstable Money flow leads to unstable society. Society should not outsource its Ultimate responsibility to Control Monetary dynamics Req #4: Algorithms and AI Should Support, not Replace Central Banks. Algorithms Fail Miserably when confronted with a situation not envisioned by their designer.

The Internet makes payment fast and convenient, but payment can't be dependent on the Internet never failing, never slow. Req #5: Digital Money Should be Transactable Even When the Internet is Jammed, or Broken Down. Money must flow during emergencies, war, hostilities and natural disasters.

One digital system should handle large, very large, medium, small, and very small transactions—fast and secure (frictionless). From the Internet of Things to International Banking. Req #6: Digital Money Should be Payable at Any Desired Resolution: Micro even Nano Payments to National Bills. Applicable to money in motion and to money at rest.

Public Serving Banking Databases will Eventually be Compromised. Ultimate protection of the Mintage is mandatory. Req #7: The Underlying Foundation of a National Digital Money System Must Be a Well-Guarded Physical Embodiment. Implicit data captured in solid chemistry can't be hacked.

Privacy of Transactions is a critical aspect of freedom and demanded by the Public. Same Privacy is abused by financial fraud, and must be controllable by government. Req #8: Digital Money Must be Flip-Ready from Transactional Privacy to Transactional Transparency Digital Coins should be passed around cash-like, but maintain a complete record of chain of custody when warranted.

Taxation and Funding of Government must be evasion-resistant Req #9: National Digital Money Must Lead to Fair and Efficient Taxation. Taxation should not be an afterthought when designing a new long lasting digital money framework. Efficient and fair taxation should be a prime design feature The mathematics underlying Crypto Currencies has no mathematical Proof of Efficacy Req #10: We Must Design Digital Money So That It Is Not Vulnerable To A Mathematician Smarter Than Its Designer. The Effect of a breach of a Bitcoin-like Crypto Math is Catastrophic. All the wealth disappears overnight.

How This Invention—The BitMint (Inclusive) Coin— Meets These Requirements: Req #1: Digital Money Today Should Anticipate Quantum Computing Tomorrow The BitMint (inclusive) coin anticipates the future technology where a string of qbits will be maintained in a stable condition. These qbits then will carry the value of the BitMint (inclusive) coin via the various fbits. Until such time, qbits are simulated by quantum-randomness sources that are activated just when the coin is minted. Time tagging the moment of being aware of the bit identities of a coin, is a way to prove the instant of ownership, so no post transaction settlement is necessary.

Req #2: Cash, Credit, and All Financial Instruments Should fit into the Same Format. The BitMint (inclusive) coin is designed as a framework for cash, credit, and resource allocation. Any thing financial may be represented through configured fbits, associated with a transactional terms.

Req #3: Digital Money Should Enable its Controllers to use Money to Best Serve Society. Unlike cryptocurrencies which are ruled by a package of pre-set rules, the BitMint (inclusive) coin is centrally minted and the mint and redemption controllers are empowered to introduce any ad-hoc, emergency, or unplanned actions to meet any unexpected surprise.

Req #4: Algorithms and AI Should Support, not Replace Central Banks. While the routine minting and redemption of coins is algorithmically done and procedurally determined, the mint owners have the power to intervene, stop, modify any algorithmic mint action.

Req #5: Digital Money Should be Transactable Even When the Internet is Jammed, or Broken Down. BitMint (inclusive) coin are transacted by passing bit information from payer to payee. This can be done with battery-operated devices while the Internet is down. The bit-wise coin information may be even traded as a printout of QR code or bar code.

Req #6: Digital Money Should be Payable at Any Desired Resolution: Micro even Nano Payments to National Bills. The mint may express any small amount of money with fbits identified by as many bits as desired, and vice versa, any large sum may be fbit expressed in a nominal way.

Req #7: The Underlying Foundation of a National Digital Money System Must Be a Well-Guarded Physical Embodiment. BitMint (inclusive) coin may be expressed through the 'rock of randomness' technology and ρcoins.

Req #8: Digital Money Must be Flip-Ready from Transactional Privacy to Transactional Transparency. The mint may dictate terms of redemption. There may be full disclosure of custodial history of each coin, or it may be blind to what happens with a coin from minting to redemption. (or anything in between).

Req #9: National Digital Money Must Lead to Fair and Efficient Taxation. BitMint (inclusive) coin is readily taxed through forced coin splitting.

Req #10: We Must Design Digital Money So That It Is Not Vulnerable To A Mathematician Smarter Than Its Designer. BitMint (inclusive) coin is based on quantum randomness not on crackable math. BitMint (inclusive) coins are not vulnerable to powerful computers beyond the computing capacity of the mint.

DETAILED DESCRIPTION OF THE INVENTION

The core capability of the BitMint system is to generate a digital equivalent for money. The essential feature of the digitized entity is that it represents a well-defined monetary value fused with a unique identity that distinguishes this representation of value from any other representation of the same value. Much as a banknote comes with a serial number that distinguishes it from any other bill of the same denomination.

The unique and most powerful feature of BitMint money is its method for digitizing any fiat currency or any commodity. The BitMint money representation insures that every expression of value will be borne by a unique entity. This is a subtle and profound distinction over the traditional way that money is represented in a computerized environment. Today about 90% of all the money in the world, is never reduced to a physical coin or to a paper bill. It is stored and transacted as computer entries. Money, today, by and large, is a number stored in a computer address. That number increases to show more money, and it is decreased to show less money. Hence payment is never a direct transfer of 'something' rather it being a negotiated adjustment of credit.

The essential characteristics of "legacy digital money" (the money the bank currently uses) is the loss of money identity. This loss was corrected by crypto currencies like bitcoin, but at an exorbitant price: indelible complexity.

BitMint achieves this combination of identity+simplicity by a simple principle: not allowing the identity of bits to express monetary value. Identity of bits is reserved to express the identity of the BitMint digital coin. This way the resultant BitMint coin may be expressed via qbits, or simulated qbits, in as much as the value of the coin may be the same regardless of the identity of bits. This fact is the fundamental distinction of BitMint from other digital money solutions. In other solutions the bit identities plays a role in determining the value of the coin. Not so in BitMint. BitMint expresses monetary value through a mathematical construct called the BitMint digital coin. The monetary value of the BitMint digital coin, (BitMint coin, or coin for short) is expressed through a string of bits where the identity of the bits is not a factor in the determination of the value of the coin. In its basic form Monetary value is determined by bit position—by the place of each bit in the string of bits knows as the "payload"—the money bits. Counting from left to right, bit in position i is associated with a value function v(i), which runs from i={first bits in the coin string–the payload} to i={last bit in the coin string}.

Monetary value is expressed via the BitMint-Valuation Function (BMV), which assigns a monetary value V to coin x as follows:

$$V_x = \Sigma v(i) \text{ for } i=1 \text{ to } i=|x|$$

Where i is a running count of the BitMint coin payload bits starting from the first bit on the left, and ending with the last bit on the right, and v(i) is the BitMint-bit value function. Notice that this formula does not specify the identity of the bit. Therefore the bit can eventfully be a qbit, or a simulated qbit. We distinguish:

v(i)>0 indicates that bit i (regardless of its identity) has a cash value of |v(i)|$.

$v(i)=0$ indicates that bit i (regardless of its identity) has no cash value of $|v(i)|=0$ \$.

$v(i)<0$ indicates that bit i (regardless of its identity) has a negative cash value of $|v(i)|$\$.

Positive cash value is spendable cash, negative cash value is debit, obligation to pay. Zero cash value implies in essence a "place holder" for money. In general each BitMint bit (regardless of its identity) can be associated with any number of valuation functions which may, or may not be cross-exchanged. The bit integral value function of a BitMint coin, $V(i)$ is defined as: $V(i)=\Sigma v(j)$ for $j=1$ to $j=i$. And may take various forms.

This representation of monetary values is a generalization of money in as much as it encompasses in one unified expression the management of positive value (cash and any financial instrument of credit, and risk allocation), the management of debt and obligation, and the management of virtual money (entities that behave like money but are not). Every financial entity of any kind can fit into the same financial rails, the way the train railways are fit for passenger trains and cargo trains. This unified railway is handled with maximum speed, ease and convenience, because it is bit-wise. It is handled with pin-pointed focus on intended use—with no diversion or misuse—owing to its format of unbreakable combination of money-value and money-identity. And all that under the unassailable protection of quantum-physics grade randomness, and with full readiness for commercial qbits. It's the rails to drive the financial trains to the 21st century. In its advanced form BitMint coins may carry several valuation functions and thereby express complex financial arrangements. BitMint coins may eventually split such that each split will assume a different part of the valuation function of the pre-split coin.

To represent a monetary value of x\$ in the BitMint platform, (basic mode) one will put together a bit string S comprising s bits, where each of these bits is assigned a value $v(i)$ for $i=1,2,\ldots s$, such that: $x=\Sigma v(i)$ for $i=1$ to $i=s$ It is noteworthy that this value formula does not take into account the identity of bits in S.

Illustration: One would represent the value of $x=16$\$ using 7 bits such that the value of these bits given below:

| bit # | value (\$) |
|---|---|
| 1 | 3 |
| 2 | 6 |
| 3 | 2 |
| 4 | 5 |

The value of these bits is: $x=\Sigma v(i)=(3+6+2+5)=16$

Please note that this value could be represented by any one of the possible 16 strings: 0000, 0001, 0010, 0100, 1000 0011, 0110, 1100 0101, 1010 1001 0111, 1110 1101, 1011, 1111

This implies that the valuation function that assigns a monetary value to a string of bits is not pointing to the specific string of the coin. Given the monetary value (e.g. 16\$ per 4 bits) one faces a 16 fold equivocation as to the identity of the string that was used to generate this sum of money. Below we expand on the above, discussing (i) coin splitting, (ii) bit identities, (iii) financial bits (fbits), (iv) coin structure BitMint Coin Splitting This (basic mode) BitMint representation of monetary value as a BitMint digital coin lends itself to coin-splitting.

A BitMint coin of value $x=V_x$ \$, is written as a string X comprised of $s=|X|$ bits, such that: $x=\Sigma v(i) \ldots$ for $i=1$ to $i=s$ Let T be a substring of X (T∈X), such that T starts with bit $t_a$ and stretches up to bit $t_b$ in X. We associate this substring with a monetary value $V(T)$ as follows: $V(T)=\Sigma v(i) \ldots$ for $i=t_a$ to $t_b$ Clearly $V(T) \leq x$. The string T will be defined as a split-coin of x, and will in turn split coin x to one, two, or three splits. We can write: $x=V(T')+V(T)+V(T'')$ where T' is the substring of x that stretches from bit 1 to bit $(t_a-1)$, and T'' is the substring of x that stretches from $(t_b+1)$ to s. If $t_a=1$ then T'='NULL' (the null string), because $t_a-1$ does not exist, and if $t_b=s$ then T''='NULL' because $t_b+1$ does not exist.

Illustration: let a BitMint coin be expressed via a bit string X, comprised of 10 bits where $v(i)=i$\$. The value of the coin is: $V(X)=1+2+3+4+5+6+7+8+9+10=55$ We can define a substring T on X with $t_a=3$ and $t_b=7$. Its value will be: $V(T)=3+4+5+6+7=25$ So X will be divided to T' stretching from bit 1 to bit $t_a-1=2$, T, and T'' stretches from $t_b+1=8$ to 10. So T'=1+2=3, and T''=8+9+10=27. And indeed $V(X)=V(T')+V(T)+V(T'')=3+25+27=55$ Each split-coin can be regarded as a bona fide coin, which means that it too can be split. Splitting hence is recursive. Eventually a BitMint coin x may be split to n split-coins: $X=T_1 || T_2 || \ldots T_n$ Where substring $T_i$ stretches from $t_{ia}$ to $t_{ib}$, for $i=1,2,\ldots n$, where: $t_{ib}+1=t_{(j+1)a}$ so that: $V(X)=\Sigma V(T_i)$ $i=1,2,\ldots n$ Coin Identity Since the identities of the BitMint bit-wise coin are not playing any role in determining the value of the coin, they can be determined to serve other purpose. Digital coins serve as a very attractive target to fraudsters. The lack of physicality opens opportunities for theft way beyond what is possible with physical coins. Any ambition to replace physical money as a robust money system will have to wrestle with the challenge of integrity and security.

Legacy money faces this challenge through an elaborate set of fences of checks and balances. Nominal crypto currencies meet this challenge with algorithmic intractability. The critique of this strategies is described in the book "Tethered Money" (Elsevier, 2015). BitMint meets the same challenge by using the freedom to set the identities of the coin bits. Any algorithmic method to set up those identities will inherently be subject to successful cryptanalysis, compromise. Therefore BitMint determines the identities of the value bits of the BitMint coin without use of deterministic tools. The identities of the BitMint coins is set up through randomness. This indeterminism is the essence of qbits, which will be used by BitMint as soon as the technology is sufficiently widespread. Until then BitMint will simulate the indeterminism of bit identity by leaving it undetermined until the very moment of minting the coin, and at that moment a quantum-grade source of randomness will set up the bit identity.

Any digital coin where the payee may apply an algorithm to the payment to decide its bona fide, will be unsustainable because the determining algorithm will have to be made public, and hence allow an attacker to brute-force check fake money again and again until he finds a fake money string that passes the determining algorithm. For decades researchers were developing such a smart algorithms before realizing that it is hopeless. It is time to turn to randomness.

The mature BitMint coin will be in a quantum state (full quantum mode). This state will be used to detect man-in-the-middle attacks, and to carry tethering information. Qbits technology is not yet sufficiently advanced to be incorporated in the BitMint payment platform, but the BitMint designers are looking forward to the day when quantum computing will be in play, and this framework is designed to enable a seamless adaptation of the new technology.

In the meanwhile we use one step below qbits—we use qbits until we activate a payment activity, at which point the qbits collapse to regular bits (partial quantum mode). This strategy prevents any would be attacker from compromising the bits ahead of their time of use. And since the collapse of bits is patternless, the collapsed qbits challenge their attacker with maximum probability defense. This probability defense is exponentially proportional to the number of bits involved. Mindful of that, BitMint was designed with an interplay between the BitMint valuation function equivocation and the bit count. This allows the mint to gauge its probability defense to its preference by adjusting the BitMint valuation function to employ enough bits to provide a sufficiently robust probability defense.

BitMint may be implemented in low-risk environments where the monetary value of the transmitted coins is way too small to attract a serious cryptanalysis effort. Such mints may be using upgraded algorithmic randomness. This is a solution that is based on pseudo-randomness that is processed through an upgrading filter. The randomness filter discards subsections of bits which are not random enough. Enhanced algorithmic randomness is easier, cheaper and operationally more reliable than true-randomness sources. (Detailed in US Patent Application #15898876).

Financial Bits

We introduce the notion of 'financial bits' with an operational mindset. For a more abstract and comprehensive view please consult the section entitled: "BitMint (inclusive) Construction Scheme".

Financial bits (fbits) in their basic form are value bits in a BitMint coin. They are identified by their position (i) in the BitMint money string, and they can be associated with one or more valuation function $v_1(i)$, $v_2(i)$, .... Regular bits in a BitMint value string are bits that qualify as financial bits (fbits). Albeit, this notion of a financial bit can be expanded to be assigned to a string off consecutive bits, to be regarded as a single financial bit: {f regular bits}→{1 fbit}

Illustration: Let A be a 12 bits string: A='1 0 0 0 1 0 1 1 0 0 1 0' we can define it as comprised of 4 financial bits, where each financial bit will be comprised of 3 regular (nominal) bits. $A=B_1-B_2-B_3-B_4$, where $B_1$='1 0 0', $B_2$='0 1 0', $B_3$='1 1 0', $B_4$='010'. Each financial bit will be assigned a valuation function, say $v(i)=10+i$. We can write then:

$v(B_1)=11$, $v(B_2)=12$, $v(B_3)=13$, $v(B_4)=14$, and hence $V(A)=\Sigma v(i)=11+12+13+14=50$.

The financial bits are the smallest unit of financial reference. It is meaningless to ask, what is the value of a nominal bit in A, or ask the same with respect to any group of bits other than a group off nominal bits that is properly packed into a financial bit. We reserve the symbol φ for a financial bit. Accordingly, a BitMint coin will be expressed via a payload (value bits) written as a string of financial bits: $\Phi = \varphi_1 \varphi_2, \ldots \varphi_s$ where s is the count of financial bits in the coin, marked as $\Phi$ or as "<0|1>".

Expanding nominal bits to financial bits comprised off nominal bits offers new operational capabilities. They are of two kind: identity and security as one kind; data and attributes as another kind. In general the f bits of a financial bit will be divided to $f_i$ identity bits, and $f_d$ data bits: $f=f_i+f_d$.

The Identity Bits within a Financial Bit: A financial abuser would face a 50% of correct guess of the identity of a single nominal bit. However with respect to a financial bit comprised of $f_i$ nominal bits dedicated to identity, the chance of correct guess drops to $2^{-f_i}$. And since the BitMint coin designer has full control over the value of $f_i$, she also has full control over the probability defense against the chance to correctly guess the identity of a financial bit. We must bear in mind that the operation of BitMint is based on the idea that rightful holders of a BitMint coin know the identity of the financial bits, while others know it not. We designate the $f_1$ identity bits as $\varphi\{\ldots\}$ The Data Bits within a Financial Bit: These bits will indicate data in a nominal way. The $f_d$ data bits may carry $2^{f_d}$ distinct messages, or data items. This data may be of any kind. Some utility options are: (i) counters, (ii) pointers, (iii) valuation parameters.

fbit counters: Some $f_{dc} \leq f_d$ bits may be assigned to count some steps from an initial zero count position to a maximum of $2^{f_{dc}}$ counts before it counts from the starting point again. So for example every time the coin changes hands the counter increments. The value of the counter could be compared to meta data that tracks chain of custody to flash out inconsistencies.

fbit pointers: Some $f_{dp} \leq f_d$ data bits may be allocated to point to the position of the fbit in the BitMint coin, or to the position of the next or precedent fbits in the coin. One pointer will state whether this bit is the first in the coin, the last in the coin, or somewhere inside. Another fbit bit will carry a flag that will also be carried by the next fbit despite its location elsewhere in the system and thereby the fbits will be able to handle physical separation of a coin.

valuation parameters: Some $f_{dv} \leq f_d$ bits may be used to specify parameters of the fbit valuation function. Let $F_d$ be the data carried by the $f_d$ data bits. The respective valuation function for the financial bit may be defined as $v(i,F_d)$, where i is the count of this fbit in the BitMint coin. The ratio $f_i/f$ is regarded as the "Data Identity Index" (DII=$f_i/f$) of the BitMint coin. Clearly if DII=0, the data identity index is zero, or say, the data is expressed in a nominal way, no bits are allocated to express identity. From a security standpoint DII=0 means that the data is 'naked' and its protection is given to external fences. On the other hand for DII=1, the data is expressed with maximum identity indication, but there is no room for data bits ($f_d$=0). The case of DII=1 is the case of maximum inherent security. In general every extra identity bit double the inherent security of the data.

Illustration: Let a BitMint coin be constructed from 4 financial bits, of size f=16 bits, of which $f_i$=13 bits and $f_d$=3. bits. The data bits ($f_d$) will be comprised of one pointer bit ($f_{dp}$=1), no counters ($f_{dc}$=0) and 2 value bits ($f_{dv}$=2). The chance for an attacker to guess this fbit right is: $2^{-13}$=0.00012. The pointer be will be set to be $F_{dp}$=1 for every fbit that is either the first or the last fbit in a coin, and set to be $F_{dp}$=0 otherwise. $F_d$ represents the data expressed in the $f_d$ bits. The two value bits will be interpreted in straight binary value $F_{dv}=\{0,1,2,3\}$, and the value function for each fbit will be: $V(i)=1+2^{F_{dv}+1}$ for i=1,2,3,4

The fbit is constructed in the following sequence: $f_i$-$f_d$, and the data bits are constructed as $f_{dp}$-$f_{dv}$. Accordingly, the BitMint coin will be set as follows:

{BitMint coin}=1001 0110 1101 0 1 11 0011 0111 0111 0 0 10 0011 1110 0101 1 0 10 0100 0101 1111 0 1 00 And interpreted as follows:

| Id | p | v |
|---|---|---|
| 1001 0110 1101 0 | 1 | 11 |
| 0011 0111 0111 0 | 0 | 10 |
| 0011 1110 0101 1 | 0 | 10 |
| 0100 0101 1111 0 | 1 | 00 |

The value of this BitMint coin will be: 17+9+9+3=38$

Binary Value Representation

The most convenient way to represent values in computing devices is through the binary series. Accordingly a good BitMint coin structure design will be with a number of value bits $f_{dv}$=n, combined with a BitMint valuation function $v(i)=2^m$ for m=0,1, . . . (n-1).

The BitMint coin will have any value N$ will be expressed through a string comprised of $s_0$ fbits where: $s_0 = \Sigma s_i$ . . . for i=1 to $2^n$ where $\{s\}_n$ is a solution to the following binary value equation, for N, the desired value of the coin $N = \Sigma s_i * 2^{m_i}$ . . . for i=1 to i=$2^n$ where $0 \leq m_i < 2^n$ For any N and n there are very many solutions for $\{m\}_n$ and $\{s\}_n$. Note that:

$$2^x + 2^x + \ldots + 2^x = 2^{(y-x)} * 2^x = 2^y$$

Illustration: Our goal is to mint a BitMint coin to carry the value of 1000$. Expressing in binary:

$$N = 1000 = 2^9 + 2^8 + 2^7 + 2^6 + 2^5 + 2^3$$

For $f_{dv}$=4, one can mint the value N with 6 fbits:

$$N_{BitMint} = [\{ \ldots \}F_{dv}=9][\{ \ldots \}F_{dv}=8][\{ \ldots \}F_{dv}=7][\{ \ldots \}F_{dv}=6][\{ \ldots \}F_{dv}=5][\{ \ldots \}F_{dv}=3]$$

where "[ ]" denotes an fbit and { . . . } denotes the identity bits in each fbit. Or, say:

$$\{s\}_2^4 = \{0,0,0,0,0,0,1,1,1,1,1,0,1,0,0\}$$

In the case where the architecture of the minted coins prescribes $f_{dv}$=3 but the sequence '111' is reserved for some other signal, then N will have to be expressed with power indices: 0,1,2,3,4,5,6. We write therefore:

$$2^7 = 2^6 + 2^6 \quad 2^8 = 2^6 + 2^6 + 2^6 + 2^6 \quad 2^9 = 2^6 + 2^6 + 2^6 + 2^6 + 2^6 + 2^6 + 2^6 + 2^6$$

We therefore will need (1+2+4+8)=15 fbits with $F_{dv}$=6, plus fbit with $F_{dv}$=5, and another fbit with $F_{cv}$=3 And we can write: $\{s\}_6 = \{15,1,0,1,0,0\}$ BitMint Coin Structure The BitMint coin is comprised of the "payload", these are the BitMint value bits (or rather BitMint fbits), and all the other bits, the "meta coin" or "meta data" that accompanies the payload so that the coin may fit into the trading platform. The meta-coin is comprised of: header Identification, Tether, Accounting, Security, trailer.

Except identification, all other meta coin fields are optional. The header and the trailer are needed when the BitMint coin is mingled with other data. These data fields bound the coin from what comes before and what comes after. If a coin is split then the first part is back stamped with a split-one tag, and the second part is headed with a split-two tag.

Header, Trailer, and Split

The header and the trailer are designed as boundary for the coin string. They assure their observer that no additional coin information is missing. Given a stream of coins, in the way to separate them is by spotting these tags. This holds in the general case when the size of the coins varies. There exists a design option under which the size of all coins will be the same. It happens when using null valuation functions on fbits, which are placed so as to insure that the given coin fits in a standard size. In that case, the need for a header and trailer is less pronounced. Note: coin integrity will also be assured with hash-signatures.

The splits tags are used to handle a coin stream which is truncated according to other considerations and may result in splitting a coin into two parts. The split-1 and split-2 tags are designed to keep track of the splits.

Identification

The identification section is comprised of:

Mint Identification: This identification is of special importance in an environment where more than one mint operates.

Coin Identification: This is a unique coin identifier. There should be only one tuple of Mint-id—Coin-id. The power of BitMint is in the inseparability of the value and the identity of the coin. Hence the id is as important as the value. Coins will retain their unique id even after been redeemed and out of play. The coin is is passed on to all the split-off coins.

Status: A tag to indicate the status of the coin. Options: (i) ready (unborn), (ii) live and well, (iii) live and sick, (iv) dead, not buried, (v) dead and buried. Status dynamics is reported in the accounting section.

Split Identification: Data to specify the subsection of the BitMint coin. Would normally identify the starting fbit and the ending fbit, or either one of them and the bit length of the payload section that comprises this split.

Time Stamp: Record of time of Minting, and Time Stamp of redeeming. Time stamp should be in a resolution of 1 second or even shorter, because the data may be used in various security protocols.

Coin Status: A tag to indicate the status of the coin. Options:

(i) ready (unborn), A minted coin that has not yet been activated (sent to a trader) will be in this status option. It is desirable that this status option will be short lived. The intent is to mint BitMint on-demand, to reduce chance of pre-use compromise.

(ii) live and well, This is the nominal status for a circulating coin. This is the only status of a coin which makes it redemption-eligible.

(iii) live and sick, This status indicates some problems with the coin, perhaps data corruption, some security alert, or due flagging by the authorities.

(iv) dead, not buried, A dead coin is a coin that was redeemed, where 'not buried' indicates that it is still in a 'challenge option' period where it is possible for a challenger to contest the payment.

(v) dead and buried, This status option reflects the fact that the coin was redeemed and out of circulation, with no option to challenge or resurrect.

Status dynamics is reported in the accounting section.

Tether

The tether section provides information about tethering the coin to specified redemption conditions. We identify:

Redeemer Terms, Coin Terms, History Terms, Blockchain Terms, Insurance Terms, Owner Certificate.

The redeemer terms identify the redeemer as meeting specified terms as to who may redeem the BitMint coin. The coin terms specify terms to be met before this coin can be redeemed. History terms refers to the chain of custody over the coin as logged in the accounting section of the coin. The coin is redeemed only if its custodian history, or other terms have been met. Blockchain terms refers to redemption terms validated by blockchain technology. Insurance terms refer to a situation where a third party takes over the inspection of the transaction, and then issues a 'good to redeem' certificate. If this redemption relates to any fraud, the insurer indemnifies BitMint. An owner certificate is a data signal issued by the owner of a BitMint coin to a redeemer, such that upon presentation of the certificate the money is released without any further conditions.

In general a BitMint coin will be redeemed only if all the required terms are met. The BitMint mint may also adopt a delay policy, accordingly under some conditions a redeemed coin is actually redeemed after some time delay, to account for a fraud situation where the victim tries to redeem the same coin a short while later. The coin will carry the tether data, which in turn will be processed by tether software run by the mint.

The tether field will always designate a master—one who could modify the tethering terms. This is important because coins may be stuck into never-redemption status, and would remain unredeemed indefinitely. The master is usually the trader who ordered the tethering.

Redeemer Terms

The redeemer terms may be identified as follows:

Any Redeemer: The case of no tethering, no restrictions. The first to present the coin for redemption will get the money. This no-tether option may still require the redeemer to specify his or her identity to receive the redeemed money.

Registered Redeemer: This is the case where traders are expected to register with the mint, and identify themselves when they redeem a coin.

Community Redeemer: Redemption may be restricted to redeemers who belong to a specified group. Redeemers then need not to identify themselves individually only as members of the group.

Id Verified Redeemer: This is the case where a redeemer must submit personal credentials to prove his or her identity. There exists a large variety for this category, from a replaceable personal identification number, to a public/private key scheme, bio-identifiers etc.

Coin Terms

Any logical conditions in any logical combination may be set as coin terms. Given a set of n terms, then they may be combined in several optimal ways to lead to a go/no-go redemption decision. It can be a regular "AND" over all the terms, meaning all terms have to be met for the coin to be redeemed. It may be an "OR" box where either one of the terms must be fulfilled in order to redeem the coin. Or it may be some combination of AND and OR. The combination of the terms may be configured as a "partial AND" where some subset of the terms must be fulfilled for redemption to occur.

History Terms

If the BitMint coin includes chain of custody information then the mint will check that the coin did not pass through the wrong hands. Some coins may be restricted for use within a closed circle. This also can be checked by the redemption decision algorithm..

Blockchain Terms

A BitMint coin may be traded on a blockchain protocol and as such the redeemer will have the public ledger to prove his ownership. The blockchain protocol may also prove the fulfillment of certain redemption conditions. In that case the BitMint redemption algorithm will inspect the public ledger and decide on redemption.

BitMint coins may move about on a blockchain protocol, and offer a fundamental advantage. While a typical blockchain exposes the value of the recorded transaction, hiding only the identities of the traders, the BitMint blockchain may (or may not) hide the traders, and it can also hide the value of the transaction. The BitMint public ledger only identifies the coin id, not the coin value.

Accounting

This section contains tracking data, chain of custody, and various other parameters, like method of transfer. BitMint coins may be blank on their history, or fully detailed with their history, or anything in between. The purpose of this section is to be able to track down the movement of money. Such functionality is important in situations where abuse, or misuse is a question to be checked. It is also of great importance for understanding the behavior of a community of traders. Money flow reflects the performance and the actions of the trading environment.

This section will keep track of the change of coin status, from pre-birth (pregnancy), live and well, to dead and not buried, then dead and buried.

Chain of Custody: The sequence of owners of the coin may be secured via a hash-signature cascade: The BitMint chain of custody is used to track coins as they split away among traders BitMint Coin Cascade The heart of a BitMint coin, $[\Phi]_0$, is its payload, which in turn is an ordered set of financial bits (fbits). Each financial bit is comprised of identity bits, and data bits. The value of the BitMint coin is the sum total of values of its financial bits. The value of financial bit $\varphi_i$ at position i in the payload is defined by a respective value function (v) and the value data in the fbit $(F_{d_v})$.

$$v(i)=v(\varphi_i)=v(F_{d_v}(i))$$

We now consider the case where $F_{d_v}(i)=w(i)$, where w(i) reflects a definite monetary value and where $v(i)=w(i)$ for i=1 to i=s. s being the number of fbits in the coin. The value of the coin will be:

$$\Phi_0=\Sigma v(i)=\Sigma w(i) \text{ for } i=1 \text{ to } i=s$$

The monetary values $w_1, w_2, \ldots w_s$ may all be expressed as BitMint coins: $w_1=[\Phi_1]$, $w_2=[\Phi_2]$, $\ldots w_s=[\Phi_s]$, and hence:

$$\Phi_0=\Sigma[\Phi] \text{ for } i=1 \text{ to } i=s$$

This construction defines a BitMint coin in terms of ingredients BitMint coins. Each of these ingredient BitMint coins, in turn may also be defined in terms of respective ingredient BitMint coins, and so indefinitely—a cascade.

We define a "cascade addition" of BitMint coins as:

$$\Phi_0=\Phi_{12\ldots s}=[\Phi_1]+[\Phi_2]+\ldots[\Phi_s]$$

The value of $\Phi_0$ depends also on its coin data:

$$[\Phi_0]=\Phi_0\Phi*$$

$\Phi*$ represents the coin-data of the BitMint coin. The incorporation of $\Phi*$ into the summation of the fbits is the important distinction between a cascade addition and a plain addition:

$$\Phi_{1+2+\ldots s}=[\Phi_1]+[\Phi_2]+\ldots[\Phi_s]$$

A plain addition is simply a collection of BitMint coins. A cascade addition incorporates the ingredient BitMint coins in another BitMint coin framework which may include tether data. What is actually being cascaded in the BitMint cascade is the tethering information at each level. This cascading is designed to give BitMint the flexibility to express any complex financial statement If no involved BitMint coin has any tether restrictions than plain addition and cascade addition coincide, both are valued as the sum value of their ingredients:

$$\Phi_{12\ldots s}=\Phi_{1+2+\ldots s}=[\Phi_1]+[\Phi_2]+\ldots[\Phi_s]$$

The tether data in the various levels of the compound BitMint coins need to be logically resolved. Such a compound coin may be subject to conflicting tethering and surprising results. For example a BitMint coin $\Phi_x$ may be comprised of two ingredient BitMint coins $\Phi_y$ and $\Phi_z$:

$$\Phi_x = \Phi_{yz} = [\Phi_y] + [\Phi_z]$$

Coins $[\Phi_y]$ and $[\Phi_z]$ each express 1000$ which expires December 31 of a given year. However the tether data in $[\Phi_x]$ makes this coin redeemable no earlier than January 1st the next year. This situation is such that $[\Phi_x]$ is worth nothing. It cannot be redeemed after December 31st, and not before the next January 1st.

Cascade Identity The identity-value coherence of the BitMint coin is amplified in the cascade. Let's define the coin-data of a BitMint coin as $\Phi *$. We express a BitMint coin as a joint payload and coin-data, and write:

$$[\Phi] = \Phi \Phi *$$

We now write:

$$\Phi = \varphi_1 \varphi_2, \ldots \varphi_s$$

And express:

$$\varphi_i = \{\ldots\}_i F_{dci} F_{dpi} F_{dvi}$$

where $\{\ldots\}_i$ represents the identity bits for $\varphi_i$. $F_{dci}$, $F_{dpi}$, $F_{dvi}$ represent the data values of the counters, the pointers and the value bits of fbit i. We now write as above:

$$\varphi_i = \{\ldots\}_i F_{dci} F_{dpi} [\Phi_i]$$

where $[\Phi_i]$ is the monetary value represented by BitMint coin $\Phi_i$

We now write:

$$[\Phi_0] = (\{\ldots\}_1 F_{dc1} F_{dp1} [\Phi_1])(\{\ldots\}_2 F_{dc2} F_{dp2} [\Phi_2]) \ldots (\{\ldots\}_s F_{dcs} F_{dps} [\Phi_s]) \Phi_0 *$$

BitMint Free Trade

BitMint was designed as the closest emulation of physical cash, enjoying its advantages, while providing digital benefits unavailable with metal coin and paper banknotes. It can be reduced to physicality (hybrid coin) and thereby completely substitute for physical cash, but mostly it is designed to be stored, paid and transacted to and from networked computing devices. The BitMint coin is securely recognized for what it is by the payee, and the transaction itself may be 'done and gone' or 'done and remembered'. Payer and payee may or may not identify each other, and payment can span from micro payments to large international wire transfers. The BitMint digital coin comes with robust security advantages, and built in flexibility.

BitMint is more than a digital cash. It's data framework, its randomness-foundation makes it an ideal framework to express any financial reality, any combination of cash, credit, and risk, individually and community wide.

A BitMint coin is traded by passing on the full bit string. This act cancels the ownership of the payer and confers ownership of the passed coin to the recipient. No account is involved, no third party: the simple act to disclosing a bit string to a recipient constitutes payment. This act raises two questions: (i) is the transferred bit string a real carrier of monetary value? And (ii) is the payer the owner of the string? If the answer to either one of these questions is negative then the payment is faulty: either mistaken or fraudulent. And hence, it is important to provide means to assure a positive answer to these two basic BitMint payment questions. This is done through the BitMint payment integrity assurance solutions.

The BitMint free trade is practiced in several modes: Cash-Equivalent Trade, Tethered Money Trade, Credit Trade, Investment Instruments Trade BitMint Payment Integrity Assurance Solutions The act of BitMint payment is conducted in association with a proper BitMint integrity assurance solution. We review the following solution categories:

Direct Payment Integrity Assurance. This option verifies the payment per-se. We consider three sub-categories: Live BitMint Exchange or Redemption, Public Ledger, Blockchain Coin Continuity, Payment per time, or payment per use may be carried out via a single coin, which pushes out the fbits one by one. A payee may verify some initial fbits, and some running fbits with some frequency, and since all these fbits emanate from the same coin, the payee will trust that the unchecked bits are bona fide.

Payer Credibility Assurance: This option is based on the payer presenting good credentials to the payee to gain his or her trust, and accept the payment as valid, without real-time BitMint verification. There are two sub-categories:

cryptographic certificate: The payer presents to the payee a certificate that proves that the payee is a trader in good standing. The certificate needs to be issued by a trusted authority.

prosecutable identification: The payer submits identification parameters that would allow the authorities to track him or her down in case the payment was a counterfeit. Biological stamps would fit this requirement. A BitMint coin may be passed along carrying with it the biological 'stamps' of all its custodians. Relaxing the need to real-time verify a payment is helpful to both parties, and hence the payee would be willing to take some risk.

Insurance: The insurance industry is expected to offer policies whereby accepting a payment from a payer who shows an insurance tag will shift the risk of a bad payment to the insurance company.

Physical Coin Assurance: Encapsulating the payment string in a physical capsule with proven virginity. The capsule being in tact will convince the payee that the money inside is valid for redemption. Such physical coin (hybrid coins) will be well disposed to physical cracking, which will expose a small flash drive or other memory device that carries the payment bits from where they are uploaded online for cyber trade.

Direct Payment Integrity Assurance

This option verifies the payment per-se. We consider three sub-categories: [1] Live BitMint Exchange or Redemption, [2] public ledger, [3] blockchain. These sub-categories are distinguished by the active party.

The live BitMint authentication is often considered old-fashioned but it is the fastest; blockchain is often hyped as the most trusted. The payer's written public-ledger is often the fittest. Blockchains may be implemented either via adopting a standard blockchain protocol, like Ethereum, or by implementing a BitMint blockchain where the recorded transactions identify the coin, not its value, and where the affirming nodes are incentivized by BitMint.

Live BitMint Exchange or Redemption: This is the basic integrity assurance method. A payee received a BitMint coin from a payer, and immediately sends it to BitMint requesting its authentication. BitMint OK signal covers both counterfeiting and double-spending issues. With today's communication levels the idea of authenticating every payment, large or small, 24/7, from anywhere in the world, is not far fetched. The large payment card companies exercising this feat routinely. This mission will be even easier for BitMint because of a new technology that delegates the authentication power to as many as desired payment authentication centers (PAC). It is important to emphasize that direct mint authentication is basic in the sense that it does not require the payer and the payee to identify themselves to each other. It is just like physical cash which can be exchanged between two complete strangers. Of course, applicable protocols may prevent payment between strangers.

| The BitMint Mint | The Payer & Payee | The Community of Traders |
|---|---|---|
| [1] BitMint | [2] Public Ledger | [3] Blockchain |

BitMint direct authentication may be exercised via a network of payment authentication centers (PAC). It is based on BitMint mistrustful data delegation protocol. Accordingly, a BitMint coin authentication center can delegate the coin authentication database to a subordinate center in such a format that will prevent the subordinate center from defrauding the parent center. The BitMint mistrustful data delegation protocol can be applied iteratively and generate a hierarchy of PACs. The community of traders will be dynamically divided among the PACs, so that each trader will have a default PAC to service him. However, if the default PAC is clogged or otherwise unavailable, then a substitute PAC will take over, using a "delayed authentication protocol".

$\{[\Phi]\}$ denotes the primary BitMint mint. $\{[/\Phi]\}$ denotes PACs derived from the main mint, and $\{[//\Phi]\}$ denotes a next generation PAC. The aggregate information of the buyers of BitMint coins can lead a smart allocation strategy, anticipating from where will come the request for exchange, verification or redemption. This strategy will lead to a hierarchical allocation where the mint ($\{[\Phi]\}$) will copy some of the coin data to subordinate payment authentication centers (PAC), ($\{[/\Phi]\}$). And they in turn will allocate part of their coins data to subordinate PACs ($\{[//\Phi]\}$). The leaves-PAC will take the heavy authentication load. If they are busy or otherwise a request for authentication is taken by a higher up PAC, that PAC will issue first a tentative authentication if the coin looks OK on its database. The authenticating PAC will wait a short interval of time (milliseconds) for status updates to flow from the corresponding leaf PAC. If the update does not regard the queried coin, then the tentative authentication is affirmed. This applies to any parent, grandparent, etc. of the applicable leaf-PAC. See below:

BitMint mistrustful data delegation protocol: The coin authentication database CAD may be processed into a conjugate form, CAD*, such that with CAD* it is possible to authenticate a redemption of a BitMint coin, but it does not allow one to redeem any coin from the higher PAC, holding the original CAD. By removing this detrimental vulnerability, delegation of authentication is possible. The conjugation process may be reapplied, to generate CAD, which allows one to Ok redemption, while not allowing it to use CAD to redeem a coin with the CAD* holder. This allows for authentication delegation to expand into a hierarchy of indefinite depth.

Cash Equivalent Trade

The objective before us is enabling free payment flow (trade) among members of the public. Payment flow is a social language that allows members of the public to express their wishes, their desires, their concerns, and most importantly allows them to cooperate to build their society. The role of BitMint is to enable such a life-giving flow. BitMint does it by building money into daily devices, and enabling money flow through the channels of cyberspace. When people make a decision to pay a sum to a payee, they should be able to make it without friction, without delay, without fear of fraud, or complications. And if people wish to keep a record, be served with a receipt, be able to prove the payment, and be able to track and record the payment in the future, then they should be able to do so. BitMint was designed for this mission. BitMint accomplishes this enabling task by establishing a mint that is leaning on a supporting bank, and projecting to the trading public. BitMint Cash Equivalent Trade is exercised among three players: The Supporting Bank, The BitMint Mint, The Trading Public. We discuss ahead the trade dynamics, and the role of three players.

Free Trade Dynamics

The BitMint free trade dynamics is presented in various aspects. We show below the basic configuration. All is rested on the bank. The money itself, $ cash never leaves the bank. It simply moves between accounts in the bank. The bank supports the mint, which is marked in the following symbol: $\{[\Phi]\}$, or $\{[<0 \$ 1]\}$. The BitMint mint interacts with the bank and per each of its coins it interacts with a coin buyer, $T_b$, and a coin redeemer, $T_r$.

The BitMint trade involves a cash-like transfer between traders without deposit action with the mint or with the bank. This "chain trading" is carried out in several modes, as seen below.

Chain Trading

Traders who pass a BitMint coin to one another without depositing money with the bank or the mint will practice one of the various trust arrangement, or a combination thereto. This, so called "chain trading" is a critical feature in the quest to digitally emulate cash trading. Coins and banknotes are 'chain traded' outside the perimeter of the bank, generally with complete anonymity. Only the trader to whom the bank issued the coins or the banknotes, or the trader to whom the bank redeemed the coins or banknotes will be known to the bank. This 'anonymity trading' is often abused by a criminal element. When emulated with a BitMint digital coin, the beneficial aspects of chain trading will be preserved, but the abuse will be well countered. Some chain trading configurations are presented below:

Zero-Trust Trading: This is the case when the payee does not trust the payer, and does not trust the payment. The payee will then send the paid BitMint coin to the BitMint mint. If the payment is authenticated by the mint then the mint will void this coin, and send down to the inquiring trader a different coin of same value and same terms (tether). See below: Payment-Trust Trading: Here the payee accepts the payment because he or she trusts the payment. This trust may be based (i) on a physical capsule in which the coin is embedded. Or (ii) based on advanced chemistry and material science where reading the coin destroys it. Another (iii) option is based on a "pay-as-you-go" draining coin, which was previously authenticated. Payer-Trust Trading: This trading procedure is based on payer's credentials. The payee accepts the payment on account of the payer providing proof for being a BitMint trader in good standing. Public-Ledger Trading In this trading solution the payee will consult a public ledger that will list the BitMint coin which is paid to him as currently being under the legal possession of the claimed payer. Upon payment the payer will update the public ledger to reflect the change of ownership. Insurance Based Trading In this setting the payee will buy insurance against faulty payments. The insurer will set some conditions, for example, checking that the payer is on the insurer 'trusted list'. The insurer will assume some of the trading risk. Blockchain Based Trade The trade with BitMint coins will be exercised through any robust blockchain protocol, but with a fundamental advantage: The respective public ledger may hide or disclose the identity of the trading (in bitcoin these identities remain hidden), and also will hide or disclose the amount of money traded (in bitcoin this mount remains exposed).

The BitMint Mint

The BitMint mint, $\{[\Phi]\}$, is the heart of the BitMint system and operation. It is comprised of three parts:

The BitMint Negotiator, $\{[\Phi]N\}$

This module communicates with the three essential partners to the BitMint operation:

The Bank, $\{¥\}$

The Coin Buyer, $T_b$

The Coin Redeemer, $T_r$

It collects money from the Buyer, credits money to the Redeemer, and shifts funds among the three pertaining bank accounts: the Mint account, the buyer's account, the redeemer's account.

The BitMint Core, $\{[\Phi]C\}$ The BitMint core is accepting minting requests and responds with minted BitMint coins.

The BitMint Coin Repository, $\{[\Phi]R\}$ This module keeps track of minted coins—their status and history. We write:

$$\{[\Phi]\}=\{[\Phi]N\}+\{[\Phi]C\}+\{[\Phi]R\}$$

The Supporting Bank

The BitMint operation hinges on a supporting bank. While the BitMint mint manufactures the digital coins, disseminates them and redeems them, the mint is not holding the money that is passed through it, and it requires a bona fide bank to lean on. The supporting bank will take no risk, and assume no additional responsibility on account of supporting the BitMint operation, except as to its commitment to make all the funds of the BitMint deposit account available in full without delay (however unlikely this scenario). On the other hand, the greater the activity of BitMint, the more deposits are made available to the bank with all the benefits thereto. From the point of view of the bank the BitMint operation is a revenue source. Its attraction brings in money from other banks to the supporting bank. As BitMint grows, so does its deposit account with the bank— more cash on hand. While the bank will have to commit to making the entire deposited sum available upon request— that is a fundamental premise of the BitMint operation—the bank runs its own risk and stress tests, and may take into account the likelihood of a sudden demand on funds.

Closed System: The protocol may first be limited to traders who have accounts with the supporting bank. In that case there is no change in the total amount of deposits as the BitMint operation rolls ahead. Funds will simply be shifted around between accounts in the bank, and much of it will linger in the BitMint coin deposit account. The nominal sequence of actions in the closed system BitMint process is: (i) money is withdrawn from a bank customer's account to the BitMint deposit account, where it lingers as long as the respective BitMint coin trades among the members of the public. Then (ii) when the coin is finally redeemed, the money is shifted from the BitMint deposit account to a bank customer account.

Open System: The BitMint coins are sold like any merchandise so the buyers may be any members of the public, not just banks' customers. When this happens then the supporting bank benefits from influx of deposits, and the greater the BitMint activity, the larger is the net influx of money to the bank. Conversely, non-bank customers when they redeem a BitMint coin will direct the money outside the bank, so the bank benefitted only during the coin trading time. Alas, there are several subtle ways to influence such external traders to open an account with the supporting bank. A local account will mean that the redemption money is immediately available, without a delay. Same frictionless benefit when that customer wishes to buy another BitMint coin. Some inducement may be offered to the redeemers. It is clear that the BitMint activity creates a strategic attraction towards the supporting bank, and it is a powerful engine of growth.

The Trading Public

Physical cash, inherently, is tradable without a trace. BitMint digital cash technology offers a perfect match, however, unlike regular cash where the mint is powerless against abuse and misdirection of its products, the BitMint mint can issue any desired level of control to build a track record of where the money traversed, and to limit its flow in any imaginable way. In other words, the BitMint cash equivalent trade offers the benefit of physical cash without its inherent shortcomings. We define three categories of traders:

Bank Customers. These are traders who have accounts with the supporting bank and are well known entities.

Traders Who Bank in Other Banks. These are fully documented traders that may be lured by the supporting bank.

Undocumented Traders: Traders who are not buyers and are not redeemers, but in-between holders of a BitMint coin—like cash. BitMint technology can eliminate this class of traders, if so desired.

Limiting BitMint Trade to Bona Fide Registered Traders: This restriction can be exercised by a 'chain of custody' protocol. Accordingly the BitMint coin will carry with it the record of its chain of owners. This chain will have to identify only registered owners, otherwise the coin will not be redeemed.

Business Model

The BitMint initiative is a source to several revenue channels, some of them direct, some indirect.

Direct Revenue Channels:

Coin Purchase Fee: A coin buyer will pay a small percentage fee (e.g. 0.2%)

Coin Redemption Fee: A coin redeemer will pay a small percentage fee (e.g. 0.3%)

Exchange & Verification Fee: Charging a small (but recurrent) fee for exchanging, or verifying a coin (e.g. 0.01%)

Float: The BitMint deposits held with the bank are counting as the bank reserve and participating in the bank revenue generation program. If the bank and the mint are separate financial entities then the bank will pay interest to the mint.

Residual Revenue: Digital cash may be marked with an expiration date. If the mint continues to operate beyond that date, then a new digital coin can be issued, otherwise regular funds will be used. This is important in order to allow a mint to close for business, if so desired, and it is a very potent anti money-laundering tool. There will be a residue of coins not redeemed by the expiration date, yet another source of revenue for the mint.

Indirect Revenue Channels: The boost in positive image, publicity and reputation will readily translate to greater business penetration. When a similar BitMint payment system is installed in a different location, even a different country, then this BitMint operation will be well disposed to facilitate long-range and even international payment through BitMint to BitMint collaboration. The broadened scope will open a new revenue channel for the bank. Collaboration between two BitMint mints will allow a Chinese merchant to sell his merchandise abroad, and be paid with BitMint digital money denominated in a foreign currency. The merchant will submit this foreign digital coin for redemption at his local supporting bank. The supporting bank will send this foreign coin to the foreign mint, and upon authentication of payment, will credit the Chinese merchant with the Chinese currency equivalent of his coin. Of course, any legal taxes, tariff, fees, etc. will be deducted from the pay. The Chinese and the foreign BitMint mints will reconcile their status every day or, as frequently as desired. Such international trade will be conducted in compliance with both countries regulations. It may be one sided: money can flow to China, but not out of China.

Priming: Payment systems are viral in nature, and this property can be well utilized as PayPal recently, and Visa and MasterCard earlier, have done. Instead of pouring money into excessive advertising, it may be wiser to invest money in reverse fees. To prime the BitMint trade the operators might offer a reverse fee to purchasers and redeemers. You buy 100¥, you get 101¥, and when you redeem 100¥ you get 100.5¥, for example. When the trade picks up, the reverse fees fade away, and are replaced with nominal fees.

Long Term Revenue Outlook: In the long range it is anticipated that the most lucrative and powerful aspect of BitMint will be tethering. Smart contracts, tracking, security are all clear useful benefits to customers, and providing them will be duly charged for. This might lead to a situation where cash-equivalent trade is free or almost free, while profits are generated from tethering fees.

Tethered Money Trade

Tethered Money Trade is based on cash-equivalent trade described above, adding to it restrictions for use. This is a fundamental issue. Money gained its centrality on account of its fungibility—its universality. Tethered money is not universal money, and trading with it amounts to robbing money of its basic attraction—that it is desirable everywhere, any time, we all want more of it. Money can be tethered, restricted in any way, form, or fashion that can be reduced to a computer code. The Major categories for tethering are: Time of Redemption Restriction: Specifying a window of time when the money can be redeemed. Code of Redemption Restriction: Specifying a redemption code to be submitted by the redeemer, without which the coin will not be redeemed. Redeemer Identity Restriction: Specifying who has the right to redeem a particular coin Transaction Restriction: Restricting redemption based on what was purchased with that money. We distinguish between mint-imposed tethers and trader-imposed tethers.

Trader-Imposed Tethers: The nature of the BitMint coin makes it well disposed to be embedded in a digital stream of conditional payment. A simple way for trader-tether is to buy a BitMint coin tethered to a redemption code. The coin buyer will then make a payment from this coin to a merchant. The merchant will be able to clear with the mint that the coin is authenticated and payable upon submission of the redemption code. The merchant will be assured that the funds to pay for its merchandise are available, and he will rush to fulfill his terms of service and supply, to satisfy the buyer, so that the buyer will release the redemption code.

Tethering may be cascaded. For example the mint will cascade a coin to be restricted to purchase food, its current owner will add restriction to buy only vegetable with that coin, A third level cascading will restrict the coin to purchasing of tomatoes.

Mint-Imposed Tethers: The mint will be asked to impose tethers on any unearned money, namely money that is given on some conditions, some expectations of use. However complicated such conditions might be, as long as they are specific enough to express in a computer program (a Turing condition) then it will be fused into the coin, and that coin will be redeemed only when the terms are fulfilled. Complicated business contracts can be reduced to Mint-tethered money.

Tethered money is most consequential in business contracts where the paid moneys are restricted by technology to what the contract dictates:

Credit Trade

The BitMint financial platform may be used to manage articles of debt, not just articles of cash. This is carried out via the negative BitMint valuation function. More details at a later date.

Investment Instrument Trade

Modern society leverages the community to share the risk for long term expensive undertakings. The BitMint formalism can fittingly serve this goal. BitMint can be structured to allow for a risk-balance long term projects, and will allow for abstract trading of risk, as well as digitizing any widely used commodity. An attractive way to curb risk is to digitize a piece of real estate, which people can see and develop confidence towards its lasting value.

Risk-Balance Long-Term Projects

Long term expensive projects involve a complex coordination of activities and their funding. The resulting contract specifies these relationship, and is used by each party to monitor the other, spot diversion from the contract, and then spend legal efforts to resolve any arising conflict. Much of it can be avoided by simply translating the contractual relationship into computer code which is tethered to the paid BitMint funds.

The utility of the BitMint solution is that once the terms are agreed upon and written into the money, then there is no need for follow-up accounting, payment inspection, and conflict resolution. Without BitMint the contractor getting hold of fungible funds may use them other than specified by the contract. The payer will then have to expend accounting energy to spot these changes, and then spend legal energy to resolve the arising conflict. When the money is paid in BitMint coins, it cannot be diverted outside the strict tethering specifications fused into the coin. To the extent that the contract was faithfully encoded into the money, there is no need to correct misspending, because misspending does not occur in the first place. Long terms projects experience a stress between the need of the project implementers to insure sufficient funding to complete the implementation plan, and the opposite need of the investors to insure that their money is well used and not misused in the fog of the project. This stress can be well handled via the BitMint platform which satisfies the project implementers that the money is there and would be paid to them when they reach the agreed upon milestones. The BitMint protocol also satisfies the investors that the money they have laid out will only be paid when and if the agreed upon milestones have been achieved.

Abstract Trading of Risk

BitMint formalism can be used to spread long term risk. Let X and Y be two commodities with a $\rho(0)=X/Y(t=0)$ price ratio between them at time point $t=0$. At a future point $t=t'$ the price ratio would be $\rho'(t')=(X/Y)_{t=t'}$. An entrepreneur E may approach a BitMint mint to issue 'abstract BitMint coins' in the form: $[\Phi X', E, \rho'(t')]$. This will amount to an obligation by E to exchange an amount $X=X'$ of commodity X at a ratio $\rho'$ with commodity Y, at time point $t'$. This abstract minted coin will be offered for sale to the public, and will trade with a moving price as time goes on. The coin will be structured at any desired resolution, so traders can split and divide such a coin and trade it like cash. These abstract coins will enjoy the full cyber protection inherent in the BitMint formalism. These investment coins may be traded on a blockchain, or through a regular public ledger, or they may be traded in privacy, as the case may be.

Modern industrial complexity might create a functional correlation between four commodities: X, Y, Z, W. This correlation might call for cascading. The coin issuing entrepreneur may wish to hedge his bet on the expected price ratio between commodities Z and W, and cascade its X-Y BitMint coins into a higher coin which is tethered to the ratio $\rho''(Z/W)$ to time point t=t':

$$\Phi_{X,Y,Z,W} = [\Phi_{X',E,\rho'(t')}][\Phi_{X',E,\rho'(t')}] \ldots [\Phi_{X',E,\rho'(t')}]$$

$$[\Phi] = \Phi_{X,Y,Z,W}[\rho(Z/W) \leq \rho'', t=t')]$$

This cascaded BitMint coin can be split and spread in the market, as the case is with every BitMint coin. The so structured coin will limit the exposure of the issuing entrepreneur. He will have to honor his X-v.-Y obligations only if the price ratio between commodities Z and W satisfies the tether.

Alternatively, the entrepreneur E might operate as a publicly traded enterprise, and might create a cascaded coin tethered to the price if its stock at time point t=t':

$$\Phi_{X,Y,Estock\ price} = [\Phi_{X',E,\rho'(t')}][\Phi_{X',E,\rho'(t')}] \ldots$$
$$[\Phi_{X',E,\rho'(t')}]$$

$$[\Phi] = \Phi_{X,Y,Estock\ price}[E_{stock\ price} \geq \{threshold\}, t=t')]$$

There may be many entrepreneurs E, E',E" fueling up the market with such abstract BitMint coins, which are circulated in the public. Such coins may be countering each other. An obligation to exchange an amount X=X' of commodity X at a ratio $\rho'(t)=\rho(X/Y)$ at time point t=t', will be countered by a second obligation to exchange an amount Y'=Y of commodity Y at same ratio $\rho'(t)$, where $X'=\rho'(t)Y'$. We write:

$$[\Phi: X' \rightarrow Y'] + [\Phi: Y' \rightarrow X'] = 0$$

The BitMint abstract investment coins may be publicly displayed, or secretly traded, either way the randomness-bashed BitMint security will hold.

BitMinting Real Estate

Real estate projects project trust due to their size, immobility, and visibility. Therefore ownership shares in such an entity are attractive, especially to people that live around the construction and reassure themselves daily of its utility and worth. So much as digitizing fiat currency, BitMint can be utilized to raise money from the public to construct an expensive piece of real estate. To build a bridge, the enterpriser will issue ownership stakes, and promise to distribute dividends from toll income. These real-estate ownership coins will be freely traded, if so desired. Alternatively these coins may limit ownership to local residents, and assign voting rights to coin holders. With their votes the coin holders will decide on business practice.

For example: A community might set out to build a much-needed toll bridge across a local river. To raise money, the community issues BitMint coins that represent stake in the bridge. These coins are implemented with a strict chain of custody, and only local citizens can legally purchase such coins. Every quarter the coin holders vote on proposal to adjust the crossing toll for the bridge. Since the people who pay those tolls are members of the community that holds the stakes for this bridge, the question of a fair toll will be resolved within the community, giving the people a sense of control over their destiny.

Guided BitMint Trade

Every government is using money flow to exercise its responsibility. BitMint is designed to facilitate such activities. We discuss the following:

Taxation: BitMint offers the efficiency of real-time taxation. Any taxable payment, upon redemption may send the tax-due to the taxation authority, and release the balance untethered to the redeemer.

Social Equity Payment: BitMint offers an important distinction between money earned against labor, and in trade, versus unearned money which is provided to various segments of society in need of government help. The former will be untethered, and the latter will be tethered to limit their use for the purpose for which these moneys are paid. This distinction will deter abuse of the social payments. It's a practical and psychological advantage to have untethered money that is free to be used anywhere, for any purpose.

Population Behavior: Government can steer people to certain behaviors by planning discounts and incentives which are expressed via BitMint tethered money. Future cars loaded with digital money, might pay speeding fine, real time. The paid fines will be reported on the dashboard, thereby discouraging risky driving.

Police Work: When hunting for a hiding criminal, it might be advantageous to impose a non-anonymous payment regimen, mandating that every payment, large or small, will be using BitMint coins. This will have the identity of all payers exposed, including the identity of the fugitive.

The InterMint. It is believed that the BitMint representation of money is mathematically the most efficient way to combine value and identity, and as such will become popular everywhere. This implies that more BitMint mints will blossom up in the financial meadow. We designed mint-to-mint protocols (The InterMint) to facilitate a global setup where interaction between mints takes the main load of long distance financial collaboration. The mints could be connected through nominal communication lines or through a blockchain configuration.

BitMint (Inclusive) Construction Scheme

We define a generic scheme for money. Money is an object of value recognized within a society of traders. While every object which is attractive to some degree by a sufficiently large number of traders can quality as 'money', we tend to distinguish money as such objects where the attraction for them is (i) wide spread within the community of traders, and (ii) stable—not a whimsical attraction. These distinction are qualitative and hence the definition of 'money' is quite flexible. A quantity of money is recognized as a 'coin'. We define a BitMint (inclusive) coin (BMIC), or "coin" as an entity of transactional value subject to "terms of transactions". The terms of transactions are logical unambiguous conditions that must be met for the coin to trans-actable. We use the symbol $\Phi$ to designate a BitMint (inclusive) coin. The value of BMIC is marked as $V(\Phi)$, and the terms of transactions for the coin are marked as $\Phi_t$. A coin does not need to be materialized, not even well defined as to its intrinsic properties, it just has to be uniquely labeled. A BitMint (inclusive) coin is comprised of sub-coins. The sub-coins are optionally labeled entities configured in an "unbound geometry", (See Patent Application No. 62/813, 281) forming a "properly evolved space". This implies that the n sub-coins comprising a BitMint (inclusive) coin are mutually defined via a distance matrix. A distance matrix is an n×n matrix where the sub-coins are listed both as columns and as rows, and the cells of the matrix designate a positive integer representing the 'distance' between the rows sub-coin and the column sub-coin. The distance between a sub-coin and itself is zero. As constructed the distance matrix will be marked with the main diagonal all zeros, and the upper triangle above the main diagonal is symmetric to the bottom triangle below the diagonal. Requiring that the space defined by the distance matrix is 'fully developed' requires that no sub-coin will have the same set of distances from all other sub-coin, as another sub-coin. This requirement insures a unique identification of each sub-coin according to its (n−1) distances towards the other sub-coins. A distance from sub-coin i to sub-coin j is the same as the distance from sub-coin j to sub-coin i. We note that each sub-coin is fully identified in the context of the coin by the list of its distances from all the other sub-coins. The value of the BitMint (inclusive) coin is the sum total of the values of the n sub-coins. We designate the n subjoins as $\varphi_1, \varphi_2, \ldots \varphi_n$: $\Phi = [\varphi_1, \varphi_2, \ldots \varphi_n]$ and marking the value of sub-coin i as $v(\varphi_i)$, we state: $V(\Phi) = \Sigma v(\varphi_i) \ldots$ for i=1,2, ... n A sub-coin, $\varphi$, may be a label-only type ("label-optional-coin", LOC, $\varphi_{LOC}$), in which case its value is a function of its position in the 'space'—namely defined by its n−1 distances from all other sub-coins. A sub-coin, may also be a BitMint (inclusive) coin per se, for which a value $v(\varphi)$ is defined along with terms of transactions $\varphi_t$. In that case the value of the sub-coin within the parent coin is defined in terms of both the coin value of the sub-coin, per its transactional terms, and also defined in terms of the sub-coin configuration in the space defined by all the sub-coins. $v(\varphi) = f(S, V(\varphi))$ where $v(\varphi)$ is the value of $\varphi$ in the parent coin, and $V(\varphi)$ is the value of $\varphi$ as a $\varphi$ coin. S is the space defined by the 0.5n(n−1) mutual distances between the n sub-coins. A sub-coin which is itself a BitMint (inclusive) coin, may again be comprised by its sub-coins. This is an iterative process, which ends with a sub-coin that is not another BitMint (inclusive) coin. It is rather a string of qbits—whether real or simulated. A sub-coin in the form of a string of q qbits will have a value defined by its distances from all the other (n−1) sub-coins despite the fact that as qbits, their bit identities is not resolved. This is a fundamental feature of the BitMint (inclusive) coin. In a simulated qbit situation, the value of the string sub-coin will also not be dependent on the bit identities of the string, despite the fact that just prior to minting of the coin the identities of those bits was established. We use the term 'financial bit' fbit to designate the sub-coins of each coin. The value of BitMint (inclusive) coin will be the sum total of the values of its financial bits. Each fbit may be comprised of sub-fbit, or it may be a real or simulated qbit-string. Note that each coin in the hierarchy is associated with its own term of transactions. This coin hierarchy was designed to encompass the digital expression of anything financial: cash, credit, debt, and all financial instruments of any purpose. The use of the 'unbound geometry' space in the construction of the BitMint (inclusive) coin aimed to allow for a sufficiently rich configuration of fbits. For most practical purposes the general 'unbound space' may collapse to an ordered list, where each fbit will be fully identified by its position in the ordered list. In an ordered list an fbit is identified by its position in the string (no label needed). Similarly in the more general case where the n fbits mutually identify themselves through their 05n(n−1) mutual distances. The valuation function will specify value to an fbit identified by its (n−1) distances from the other fbits.

The Boundary Control Principle

The design of the BitMint (inclusive) coin is motivated by the "Boundary Control Principle" which states: "Money should be centrally minted, and ultimately redeemed by the same mint, but between these boundaries of minting and redeeming the movement, transaction, operation and use of the BitMint (inclusive) coins should be in the hands of the trading public which the BitMint (inclusive) system is designed to serve."

This implies sensitivity towards privacy, expressed via flexibility as to how much transactional history needs to be recorded in the coin metadata, and it refers to the issue of trust and security. Anyone can "mint" a string of bits. It is a challenge to assure the payee that the bits coming his way are worth their purported value. The principle means of the BitMint (inclusive) coin methodology is to rely on high quality randomness. It is expressed through the identity-only bits within the financial bits, and it may be additionally expressed via the randomized distance matrix that configures the fbits of a coin in a 'space'—a set of mutual distances designed to complement the randomized bits within the fbit with randomized data of the relative configuration of those fbits within the coin. Proper handling of the fbits distance matrix will provide a trail for the mint, or to any investigator to realize the dynamics of the coins as they progressed from minting to redemption.

The fbit Space

As described the fbits within a coin are mutually configured in a 'space' defined via a distance matrix that specifies 0.5n(n−1) distance values among the n fbits within a coin. This 'space', these distances, mutually identify the fbits in terms of each other, and specifies a relationship. There are ways to let these distances reflect some situation among the fbits, like the example of risk-affinity. Or alternatively, these distances can be used to overlay a layer of security and accountability to the coin. Enabling thereby more freedom for the trader to handle the coins.

If the 0.5n(n−1) distances between the n fbits are all randomized when a trader passes to another an fbit, $\varphi$ along the (n−1) distances between that fbit and the other fbits in the paid-from coin, the payer then further proves that he or she are in possession of the claimed coins. $\varphi_i(d_{i,1}, d_{i,2}, \ldots d_{i,n-1})$ where $d_{ij}$ is the distance between $\varphi_i$ to $\varphi_j$. Each coin may be defined with its own randomization space, namely the range of integers from a low, l, and a high h integer such that every distance, r, in the coin will be a randomized selection, within this interval: $l \leq r \leq h$. If an fbit is transferred from a previously split coin then it will reach its next payee with fewer distances. The number of distances itself is indicative. To redeem the coin split (the fbits) it will be required to identify the distances submitted with the fbit by its payer, and the mint will be able verify these values to insure bona fide status.

We may define the notion of 'fbit centrality', $\Omega$, as the sum of its distances from all other fbits: $\Omega(\varphi_i) = \Sigma d_{ij} \ldots$ for j=1,2, ... n If the selection of distances is such that no two fbits have the same $\Omega$ value, then this value becomes an fbit-identifier. This implies that fbits may be addressed, referred to, and transferred without an explicit id. Their $\Omega$ value becomes their de-facto id.

BitMint (Inclusive) Coin Dynamics

Money was designated above as an entity of wide spread stable attraction throughout the community of traders—the society of reference. The BitMint (inclusive) idea is that this 'money entity' should be manufactured with designed attributes to make it easy, safe, and efficient to trade with. This manufactured money entity should be de-materialized, an information-package. It should have no attraction per se, only attraction by agreement. The reason is that any entity of an attraction per se is treated unevenly by the community of traders, some like it more, some like it less. An abstract entity, attractive-by-agreement can be universal. And being abstract it is easy to handle, store, and transact. It is also easy to mint, and easy to redeem. The BitMint (inclusive) coin structure as described above is considered an optimized flexible solution to meet this challenge. We now define the dynamics of the BitMint (inclusive) coin. Since the BitMint (inclusive) coin is not a natural entity, it must be manufactured—minted. To that end the community of traders, the society must erect a "mint". The mint (BitMint) will issue BitMint (inclusive) coins and redeem them. Between minting and redemption the coins are transacted within the community of traders. We discuss ahead the dynamics of minting/redemption, and trade within the community of traders.

Minting/Redemption

The BitMint (inclusive) coin mint will use good randomness source to build the payload bits of the fbits—the identity carriers. it will keep a strong back up system and a front database to work with to handle redemption of coins as they come back to be redeemed. All the coins with all their fbits will remain logged in the mint, to allow for any level of back accounting necessary.

Trade within the Community of Traders

Traders can pass to each other an entire BitMint (inclusive) coin. Traders can split BitMint (inclusive) coins and join BitMint (inclusive) coin. When a BitMint (inclusive) is split, each split acquires the full measure of the transactional terms of the original coin. If coin C splits to $C_1$ and $C_2$, then we write: $T(C)=T(C_1)=T(C_2)$ Where $T(x)$ means the 'transactional terms of coin x'. When two coins are joints the terms of their respective transactions are joint. Using the above notation, we may write: $T(C)=T(C_1)\cup T(C_2)$ Trading within the community will require some added data to the meta data of the BitMint (inclusive) coin so that the mint will be able to trace the splitting and the joining that happened to the originally minted coin. This is necessary for proper redemption of the coins, Coin Splitting A coin $\Phi$ comprised of n fbits: $\varphi_1, \varphi_2, \ldots \varphi_n$ defined with mutual distances [i,j] between $\varphi_i$ and $\varphi_j$, for ij,=1,2, . . . n may be split in $2^n$ ways. Every subset of m fbits may be separated to one coin split, $C_1$ leaving the other n-m fbits as the other split, $C_2$, such that: $V(C)=V(C_1)+V(C_2)$ Where C is the pre-split coin, and $V(X)$ is the value of coin X.

The split may happen in two modes: 'fbit-split', or 'f-split', and 'valuation-split' or 'v-split'. In an f-split each coin carries only the information regarding its own fbits. In a v-split each coin retains information of all the fbits in the original coin, only the valuation function is adjusted. In an f-split the split coin carries the fbits with its distances. So the m<n fbits in the split are defined with 0.5m(m-1) distances, and all the 0.5n(n-1) in the original coin. The minimum split size is 2 fbits defined through their mutual distance. Since the fbits are defined through the distance matrix between them, a split with a single fbit has no distances, and is not well defined. For the f-split to be well defined all the 0.5n(n-1) distances of the original coin must be distinct. E.g.: 1,2, . . . 0.5n(n-1) so that each split will be fully identified. We may write: $V(C)=\Sigma v(\varphi_i)$ . . . for i=1,2, . . . n $V(C_1)=\Sigma v(\varphi_i)$ . . . for i=1,2, . . . m, $V(C_2)=\Sigma v(\varphi_i)$ . . . for i=m+1, m+2, . . . n In a 'v-split' all the fbits are carried in every split. The valuation function is the one spitted. In the simplest case split 1 retains the valuation of m fbits, assigning the valuation of the remaining (n−m) fbits to zero, while the other split retains the valuation of the (n−m) fbits, and assigns to zero the valuation of the m fbits of the split. Clearly the sum values of the splits is the value of the pre-split coin. We may write: $V(C)=\Sigma v(\varphi_i)$ . . . for i=1,2, . . . n $V(C_1)=\Sigma v_1(\varphi_i)$ . . . for i=1,2, . . . n, $V(C_2)=\Sigma v_2(\varphi_i)$ . . . for i=1,2, . . . n where $v(\varphi_i)=v_1(\varphi_i)+v_2(\varphi_i)$ . . . for i=1,2, . . . n v-splitting is of special interest in the case where the valuation function of an fbits is comprised of several complementary valuation functions. Let v be the valuation function of a given fbit. Let v be comprised of $v_1$ and $v_2$, such that $v(\varphi)=v_1(\varphi)+v_2(\varphi)$. The coin where this fbit is fitted may be split to one coin where the valuation will be $v_1(\varphi)$ and another where the valuation function will be $v_2(\varphi)$. It is of special interest when $v_1$ is positive valuation and $v_2$ is of negative valuation (debt).

Coin Joining

Coin $C_m$ comprised of m fbits, and coin $C_n$ comprised of n fbits may be joined to form coin $C_p$ where p=m+n, and where: $V(C_p)=V(C_m)+V(C_n)$ and: $T(C_p)=R(C_m)\cup T(C_n)$ By assigning nm distances so that each fbit has assigned distances to all the fbits of the opposite coin. We mark |X| as the number of fbits in coin x, and write: $|C_m|=0.5m(m-1)$, $|C_n|=0.5n(n-1)$ and: $|C_p|=0.5p(p-1)=|C_m|+|C_n|+mn$ The added mk distances may be of same value if the coins and their splits are handled in the v-split mode. If they are in the f-split mode then all the distances must be unique, and the joint coin will have 0.5p(p-1) unique distances, or a bit less. It will be less because there is no need to establish a distance value to an fbit for which the valuation function is zero. The joint coin will have to carry meta data that would reveal to the mint, when it comes to redemption, how the joint coin was joined, so that the mint can properly redeem the joint coin.

qbit—Real and Simulation

At some point in the future we will have the technology to maintain coherence over time and keep qbits in their "virgin" form. Such qbits will be minted as labels of fbits.

And will be transacted in coherence. The qbit will be resolved upon redemption. Until then we simulate this situation by (i) using a quantum randomness source to determine the bit identities of fbits just—and not before—the BitMint coin is minted. Transaction of a BitMint coin amounts to transfer of fbit bit identities to the payee. Knowledge of the bit identity of the fbit is proof positive of being paid, or ownership of the coin over anyone for whom the record shows that the same knowledge was acquired earlier.

In other words payment of a BitMint coin is instantaneous, there is no 'dead time' like with checks and other payments.

Meaningful fbit Distances

As described the distance values among the fbits are arbitrary and of no special meaning. This can be upgraded to assign meaning to the fbit distances. We discuss here risk-linkage fbit distances. As constructed the fbits that comprise a BitMint (inclusive) coin are defined via the distance matrix, and may in turn be BitMint (inclusive) coin themselves. Each such sub-BitMint (inclusive) coin may be defined over a different underlying commodity. One may be denominated in gold, the other in silver, and the third in oil, while the rest in US$. If two such fbits are judged as tightly linked in terms of valuation risk, then they would be marked in the coin through a small distance. If they are judged to be remotely linked then the distance assigning between them will be large.

Taxation

Taxation is procedurally easy, fair, transparent and resistant to fraud. It is essentially based on the notion of coin splitting. Any amount or measure of BitMint (inclusive) coin may be split to a portion that is by "societal force" assigned to society-at-large aims, and the other split that is left under the control of who owned the pre-split coin. This way taxation may happen without the mint having the chase the owner of a particular coin. The splitting is done at the mint with public exposure. So the coin owner and the trading public all know that the pre-taxed coin is now worth less because it was taxed. And the new value is public information, even if the ownership of the coin may not be. Taxation splitting may be in the form of an f-split, or a v-split. It may be across the board, so that every coin in the space is equally taxed, or it may be graded, some coins based on any number of conditions are taxed more than others. The mint could assign randomness to pick coins at random for the purpose of taxation.

Review of the Notion of Financial Bits

A BitMint (inclusive) coin is a collection of financial bits bound by a stamp of meta data, and terms of redemption. The financial bit is the value carrying entity, and it is designed with great flexibility in order to serve the varied complexity of modern finance. Similarly, the relationship between the financial bits (fbits) of a given coin is set up with maximum flexible construction, taken from the notion of 'unbound geometry". The combined purpose is trust, versatility, efficiency and security. The configuration of fbits within a coin may range from maximum flexibility expressed by arbitrary distance values for the in-between fbit distances, to the simple idea of an ordered list where each fbit has a specified location on that list. The implementer of any BitMint (inclusive) coin system will choose the right form of fbit configuration.

The configuration of fbits within a coin may be designed to remove the need to assign a label, an id, to each fbit. If the fbit is in position i on an ordered list 1,2, . . . i,(i+1),(i+2) then this position defines the fbit without equivocation. If the full 'unbound geometry' space is implemented then as long as the centrality metric of each fbit is unique, each fbit is fully identified. The centrality metric is simply the sum of all the (n−1) distances from an fbit to the other (n−1) fbits in the coin. The actual integer values of the distances may be set to reflect some affinity among the fbits, or it may set to boost the security of the system owing to the randomized selection of distance values.

As to the fbit itself, it may range from a simple one bit, or a string of t bits—all 'payload,' namely bits such that their identity has no implication as to their monetary value; up to a template that includes payload and fbit meta data for various purposes, including for the purpose of serving as an input parameter for the fbit valuation function. Here too, the implementer of a particular BitMint (inclusive) system will choose the right fbit design.

Valuation Function—Elaboration

BitMint money (basic mode) is comprised of a string of bits such that the identities of the bits carry no information about the value of the string. This leaves the bit-count as the sole bearer of value, as the identities of all the bits are used for establishing a unique identity to the monetary value of the string. This bit-count to value mapping is carried out via the BitMint valuation function ($V=V_{BitMint}$). Counting the bits of a given BitMint money string S from left to right, $i=1,2, \ldots |S|$, the value of the first i bits will be V(i), denominated in the currency digitized by the BitMint digital money. The value contribution of the bit in the i position, v(i) is: $v(i)=V(i)-V(i-1)$. And hence: $V(i)=\Sigma v(j)$ for j=1 to j=i. The BitMint valuation function V is defined over i=1 to i=|S|, and is not defined over V(t) for t<1 nor for t>|S|. In the general case the v(i) may be positive, zero, or negative, as interpreted ahead: The most common, "natural" case is: $v(i)>0$ for $i=1,2, \ldots s$, where s is the bit count of S: s=|S|. This implies that the bit is position i represents a valuation expressed in the digitized currency expressed in the string S. When a transmitting trader passes bit i to a recipient trader, it is construed that the transmitter paid the recipient v(i) amount of the digitized currency. For security reasons the minimum number of transmitted bits that would qualify as a 'payment' may be preset number quite larger than one, but nonetheless each bit in the money string is associated with a monetary value identified by the BitMint valuation function. The case where v(i)=0, is one where this particular bit does not represent any value, and transmitting it from one trader to the other does not manifest a process of cash payment (no transfer of the digitized currency or commodity). The case where v(i)<0 is one where the bit in position s carries a negative monetary value. This implies that the transmitter in that case is imposing on the recipient a monetary obligation in the amount of v(i). By accepting this BitMint money string, the recipient acknowledges this obligation. The BitMint coin includes meta data that may specify the terms of this obligation, mainly with respect to time of honoring this obligation. The use and the implications of these three valuation options will be discussed below.

The BitMint payment process is comprised of communicating a substring T∈S from a transmitter to a recipient. T is comprised of t=|T| consecutive bits in S. The transmitted Value, $V_t=\Sigma v(i)$ for $i=t_b$ to $i=t_e$, where $t_b$ is the position of the first, the beginning bit of T in S, and $t_e$ is the position in S of the ending bit of T. Also: $V_t=V(t_e)-V(t_b-1)$. Since v(s) may be positive, zero or negative, so is the range of options for the value of the payment transmission, T.

The Positive Valuation Case

This is the case where v(i)>0 for $i=1,2, \ldots |S|$. In this case the transmission of any bit represents a positive payment, namely a transfer of monetary value from the transmitter to the recipient.

In the most common case $v(i)=v(j)=\beta$ for $i,j=1,2, \ldots |S|$. And in that case the transmission of a substring T∈S constitutes a payment of $V_t=\beta*|T|$. The holder of a BitMint string S, wishing to make a payment of $V_t$ can do so by sending |S|−|T| strings of size |T|. These will be equivalent payments. The T string may start with the first bit of s: i=1, or at i=2,3, . . . etch up to i=|S|−|T|. The 2nd case is the accelerated case where v(i)>v(i−1), and in that case a substring T that is positioned further to the right on S will represent a higher monetary value than a string T' of same length (|T|=|T'|) positioned further left. This allows a transmitter to choose between high and low values, or to choose what will be the exact size of a payment string that will deliver a known monetary value. Accelerated BitMint money strings may have distinct geometry: early steep, or late steep categories. An "early steep" string will have large v(i) values for bits closer to the beginning of the string, and low v(i) values for strings closer to the end of S. It's the opposite for "late steep" strings. Both categories will allow a transmitter to make small payments as well as medium and large payments using roughly the same number of transmitted bits. The transmitter will simply properly select the location of T on S. The variant bit value may be used to schedule variant payment over time, with the string size remaining constant, but the value changes from string to string.

The Zero Valuation Case

In its simplest manifestation this case will reflect a BitMint money string where the monetary value of the string is zero. This is the case where $v(i)=0$ for $i=1,2, \ldots |S|$. In that case also $V(i)=0$ for $i=1,2, \ldots |S|$. Transmitting such a string, or part thereof does not constitute a transfer of value (payment). It serves though to test a system, to transmit information, to obfuscate an observer, and to track conduct and behavior. Zero value bits may also appear as a substring $T_0$ in S. This might be useful in several protocols. Zero value bits may be padded to a value substring $T \rightarrow T \| T_0$, to create any desired effect, and to prevent information leakage. A value-less substring $T_0$ can also couple between two transmitted value strings $T_1$ and $T_2$, connected by the value-less substring $T_0$.

The Negative Valuation Case

When the value contribution of a bit i, $v(i)<0$, is negative, then transmitting it implies imposing a payment obligation on the recipient. In practice it means that when the recipient redeems those negative bits with the mint, the mint then credits that amount to the transmitter of the bits (after being paid that amount by the redeemer, or from any other source). There are several situations when this negative monetary value becomes handy. Two trading partners may operate in an environment where it is easier for bits to flow one way, as opposed to the other. In that case, paying will be accomplished by receiving negative value bits rather than by transmitting positively charged bits.

The negative bits may be part of an agreed discount. A transmitter pays $X to a recipient, as part of an agreement for a discount at the amount of $Y. This situation could be resolved by transmitting $(X-Y), but by so doing the record of the original price and the discount thereof is not reflected in the transaction. By transmitting a string $T_x \mu T_y$, which is the combined strings $T_x$ representing $X, and a string $T_y$ representing -$Y, the terms of the transaction are preserved in the history of the payment. In pledge situations where a donor pledges to donate a sum $X to a cause. That cause will transmit a string $T_x$ of negatively charged bits to the donor, to preserve the pledge. It will be up to the donor to pass this string to the mint, for the mint to debit the donor account in favor of the cause.

Loan situation: When a loan-maker loans $X to a borrower, the loan transaction may be consummated by the loan-maker passing two strings $T_x$ and $T_y$, where $T_x$ represents $X and $T_y$ represents -$(X+R)—negatively charged. Where R represents the interest due on the loan at the time when the loan is due to be repaid. $T_x$ is readily payable. The borrower can use it to make payments, consistent with the terms of the loan (which are written into the BitMint digital coin meta data section). The $T_y$, on the other hand will be payable at a later date, when the loan is due. The borrower then will pass the $T_y$ to the mint, which will then debit the borrower account and pay the loan maker (either with BitMint money or otherwise).

Full Variability BitMint Valuation Function

A BitMint coin may be a combination of the three types. The value function V(s) may take any form, regardless of the total value of the coin V(|S|). Some sections of V may be flat, others may be a straight upward line or a straight downward line, and yet other sections may be parabolic or exponential, etc.

The coin string and the valuation function may be held separately. Consider a coin-holder (CH) unaware of the valuation function, and consider separately a valuation-function holder (VFH), who is not aware of the identities of the |S| bits of S. The VFH will be charged with making payments based on the valuation function, which it knows. The VFH will then determine that the coin holder should make a payment in the form of communicating to the payee a string say, T, which is a subsection of a full BitMint coin, string S, and is comprised of the bits from position i to the bit in position j in S. The VFH will then communicate the details of T to the coin holder (CH) for execution. The coin holder, (CH), will execute the transfer of money string T defined for it by the VFH as the substring that starts with bit i and ends with bit j. The CH may not be aware of the sum paid, much as the VFH may not be aware of the identities of the paid bits. This separation may be utilized in various security protocols.

Superposition Valuation

A BitMint coin, B, may represent w distinct currencies $C_1, C_2, \ldots C_w$, each with measure $c_{1b}, c_{2b}, \ldots c_{wb}$. We define here currency as a unit of measurement and quantification of either the possession of value or of obligation of value, namely as credit, or as debit. This abstraction of the notion of currency allows BitMint to use the same rails to move around both cash and credit. It's a fundamental process advantage to represent both cash and credit in the same format. According to the BitMint principle the coin B should be redeemed against well specified amounts of these w currencies. A trader who comes to redeem, say, half of B (0.5B) will receive half of the coin quantities for each currency $0.5c_{1b}, 0.5c_{2b}, \ldots 0.5c_{wb}$. We first assume that these w currencies can be added. In that case the valuation function V(s) can be written as the summation of the w currencies represented by this coin. $V(i)=\Sigma V_j(i)$ for $j=1,2, \ldots w$ for each $i=1,2, \ldots |S|$.

In the general case a simple arithmetic summation is impossible, and the set of individual currencies superposition on the digital coin is the most concise way to express the coin. In the simple case the valuation functions for each currency will run parallel in a mutually coordinated way. But this is not necessary. For simplicity we analyze the case of w=2: a BitMint coin that represents two currencies, X and Y. We first comment that the following discussion only makes sense for two currencies that are not readily interchangeable. Because if there is a ready conversion coefficient α, such that y=α*x, where x and y are given quantities of currencies X and Y respectively, then we have:

$$V(i)=V_x(i)+V_y(i)=V_x+\alpha V_x=V_x(i)*(1+\alpha)=V'_x(i)$$

And the superposition issue is readily condensed into a single BitMint valuation function. The same applies for w>2, if all the w currencies are readily interchangeable.

We conclude then that the currencies are not readily interchangeable. In fact the currencies may be of different nature: one may be regular money, another may be access time to a privileged service, a third may be an accounting device, to follow on the activities of payers and payees. The various currencies may also be essentially the same currency but with a different redemption date. This prevents a risk-free exchange rate, and deny the existence of a simple "α" as we have seen above. One may note that any superimposed BitMint coin may be exchanged to two or more single-valued coins. The advantage in the multi-valued coin is the economy of the 'smart contract', that is the metadata that is used to tether the money or the obligation to their terms.

Multi-valuation also guarantees the connection between the various expressions of value. They all travel together as the coin is moved around.

Illustration: A buyer and a seller agree on terms. Accordingly, the buyer can buy up to some 500 units of merchandise for a total of $100,000. $80,000 of which are payable in cash, and the balance, $20,000 payable at a specified later date. Using BitMint, the cash will be regarded as the X currency, and the delayed payment regarded as a Y currency (recall the abstracted interpretation of currency above). In the simple case, the mint would issue a money string S comprised of, say, $|S|=2,400,000$ bits. Accordingly we will have: $V_x(i)=(80,000/2,400,000)*i=(1/30)*i$, for $i=1,2,\ldots 2,400,000$. And $V_y=(20,000/2,400,000)*i=(1/120)*i$ for the same range of i.

The buyer may argue that the merchandise will not fit very well, so he may buy only a small amount, and in that case he may wish to pay less. However, if all fits the buyer will agree to pay the full sum. This can be accomplished using a "late steep" valuation function, of the form $V_y(i)=\beta*i^2$. It is easy to find the value of β, since if the entire agreed amount is actually purchased, the buyer will pay the full amount: Y=$20,000. Hence $V_y(i=2,400,000)=\beta*i^2$. This computes to: $\beta=(20,000)/(2,400,000)^2=0.347*10^{-8}$.

For comparison let's see how much does the buyer pay after ordering 250 units of the merchandise. The payment for this amount will be a string of BitMint money of length: $(250/500)*(2,400,000)=1,200,000$ bits, transferred from the buyer to the seller.

First the linear case: The seller will submit the 1,200,000 bits to the mint and in return will have an immediate credit in its account of the X currency, valued as $V_x(i=1,200,000)=(1/30)*(1,200,000)=$40,000$. The mint will also send the seller new BitMint money at the value of the Y currency: $V_y(i=1,200,000)=(1/120)*(1,200,000)=$10,000$. This BitMint money will only be redeemable at the designated redemption date, and only if the buyer account has sufficient funds at that time.

In the second case, ("late steep") the X currency will be the same, but the Y currency situation will be different:

$$V_y(i=1,200,000)=\beta*(1,200,000)^2=(0.347*10^{-8})*(1,200,000)=\$4990$$

Less than half than in the linear case. The mint will convey to the seller a BitMint money string in the amount of $4990 redeemable not earlier than the designated redemption date.

Of course, if all the 500 units are ordered, then the two cases coincide. The way the value is structured over the bits of the coin, together with the dynamics of passing them around, amounts to a payment order that reflects the agreed upon distribution of assets, risk and obligations. And to the extent that the coin and its meta data is exposed beyond the payer and the payee, this is also a means for transparency.

In trading practice the mint may issue the full string of 2,400,000 bits upfront to the buyer, to pay with this string to the seller. However this BitMint coin will be marked with a 'not redemption ready' marker that would progressively be removed when the buyer actually pays the mint for more and more bits in the string. The Y currency bits that are issued by the mint to the seller are nominally pre-paid for by the buyer. And if not, then they come with a note that makes it clear that it is expected that the buyer will pay the mint the Y amounts before the due date, and this expectation is a condition for redemption. The mint itself does not take chances. This arrangement via BitMint utilizes the credit and reputation both the seller and the buyer have with BitMint, as opposed to mutual strangeness between the seller and the buyer.

Use Cases

Some use cases discussed here:

Complexity Activity Accounting

Credit Management

Complexity Activity Accounting

Money per-se emerged as a very effective regulatory device. Modern society is comprised of thousands of different job titles, each consuming resources from others and delivering a valuable product to his or her customers. This dynamics is recorded, tracked, and motivated by the flow of money. This situation will also apply to any complex, non-hierarchal highly interactive environment as is envisioned for the Internet of Things and the Internet of Everything. If any node in such an interactive network is charged for every service it gets from other nodes, and is getting paid for every service it delivers to other nodes then the record of the network money flow will be a record of the activity of the network. A record needed for accounting purposes, for liability management, and as a basis for study and research into the dynamics of the network in order to improve it. This vision makes it valuable for networks to interact-with-pay, to pay and get paid for every service however small. This can be done with BitMint money of nominal value or of zero value, where there is no wealth transfer only accurate accounting of the activity of the network. It is the frictionless property of BitMint payment, defining payment in its most basic mathematical element: amount and identity of coin, that makes it economical to account for payment per the tiniest service or product, and thereby follow network dynamics, and study it in ways unavailable otherwise.

By attaching to each BitMint coin the full record of its custody chain, it becomes more and more difficult for hackers and abusers to falsify record, to steal identities, and game the system. To take the role of a node in the network, the hacker will have to steal the victim's money, along with the victim's means to assert his, her or its identity.

Credit Management

BitMint manages cash and credit over the same rails, with the same speed, security and versatility. When a transmitter sends BitMint bit-wise money to a recipient, it may be positively charged (valued), where it is a cash equivalent, or it may be negatively charged (negatively valued), where it is credit (loan, obligation). With BitMint superposition protocol a loan can be extended with the terms of its pay-back captured within the same money string. The loan giver will create a superposition. The positive charge (the cash of the loan) with a negative charge, which implies money that the recipient is to pay the transmitter at a time specified in the metadata associated with the transmitted coin. This superimposition will be at bit-wise resolution. The fact that the very same bits are associated with both the loan and its repayment (positive and negative BitMint valuation functions) allows for this BitMint money to be moved around. It enables smooth accounting, and management of a credit cascade where an original loan maker makes a loan to a first recipient, who then passes all or part of that money to a second recipient—passing the cash and the obligation to pay back, all in the same string of bits. The BitMint user has a great deal of flexibility in structuring the cash-credit superimposition. We present two ways:

1. Ongoing Interest: in this way every amount of cash passes, X, obligates the recipient to pay $Y=(1+r)*X$, where r represents the interest on the loan. BitMint will issue a value string S. The bits in S will be associated with a positive valuation function $V_x(i)=\beta*i$ for $i=1,2, \ldots |S|$, and a negative valuation function $V_y(i)=-(1+r)\beta*i$ for $i=1,2,3,\ldots |S|$. With every amount paid as cash, the recipient assumes a corresponding obligation.

2. Late Interest: in this way a loan in the amount of $X made at time point t=0, is to be returned as a sum $Y>$X at time point t=1. The BitMint money will be expressed as a money string $T_x$ marked positive with a BitMint valuation function $V_x(i)$, for $i=1,2,\ldots |T_x|$, and also marked negatively by $V_y(i)=-V_x(i)$ for $i=1,2,\ldots |T_x|$, plus another string R, representing $R=$Y−$X, for which the positive part will be zero $V_r(j)=0$, and the negative charge will be less than zero $V_r(j)<0$ for j running from the first bit of R to the last bit of R.

Cascaded Credit

A BitMint coin with double valuation of positive value (cash) and negative values (credit, obligation), is a mechanism to capture both the money transfer, the issuing of the loan, and the obligation to pay back the loan at specified time with given conditions. Such a double-valued coin may be further divided and issued further, and then again recursively. Each payer of the obligation will secure a receipt from its payee, which will be the basis of any claim, if the credit is not repaid as agreed. In summary, there will a cascade of loan giving with a parallel cascade of receipts. If this cascade is exposed in an open ledger then it allows others to see the credit/cash situation of the traders.

Illustration: Let Alice issue a $1000 loan to Bob on January 1st. The money is issued through a double valued BitMint coin which includes the positive valuation function $V(i)$ per bits $i=1,2,\ldots |S|$, where S is the BitMint money string, and a negative valuation function $V'(i)$, such that $V'(|S|)=1050$, due on July 1st. Bob then divides the BitMint coin to two halves, giving one half to Carla and the other half to David. Carla and David each receives cash in the amount of $500, with obligation to pay $525 on July 1st. The coin can cascade down any number of times. Carla and David will be responsible for repayment of the loan to Bob, and Bob will be responsible for repayment to Alice.

Open Credit Ledger

Bitcoin introduced the innovation of a public ledger that details the distribution of the bitcoin money among its traders. A similar public ledger can detail, document and make public the distribution of BitMint money among its traders. This includes super-imposed BitMint money, and in particular credit and cash distribution. Credit extended via BitMint may be made public, with the traders being masked or being exposed as the case may be. This will give the trading public a detailed view of risk distribution. When the traders are publicly traded companies then this public ledger is of great significance for investors.

Credit Cash Resolution

A set of traders will exchange cash and credit in ways that will be well recorded and expressed through the BitMint payment platform. Every negative valuation of a BitMint coin may be neutralized with a positive valuation of a matching coin. The accounting of positive and negative money valuation provides accounting clarity and versatility in ways that resemble the versatility and clarity that was experienced by arithmetic when the natural numbers were expanded to integers.

Illustration: Alice issues a BitMint coin to Bob, for the sum of $5000, on February 1st. Bob agreed to repay the loan on November 1st of same year at the sum of $5250. Bob, in turn has secured a grant for its research, which includes a pre-paid sum of $8000, which will be released for Bob's use on October 1st. Bob can then ask the mint to reassign $5250 out of the $8000 as cash claimed by Alice and in return nullify his negative obligation on the coin given to him by Alice. Bob will now have $5000 to use without further obligation, because he used the BitMint coin accounting procedures to assign money coming to him later as money that satisfies his contracted obligation.

In another case the $8000 to be given to Bob on October 1st are in a form of credit, promise to pay, not pre-paid. In that case Bob can also assign $5250 from that promise as credit in favor of Alice. Alice might release the obligation of Bob, if she considers the source of the $8000 promise to be more reliable, but would not release Bob from his obligation if the source of the $8000 promise is not sufficiently reliable.

BitMint Payment for Daily Meds: At home patients may be delivered, say, once a month, a locked box including all their daily drugs for a period of a month. The box will release the daily pills, when paid. Payment may be accomplished using NFC communication (among other methods, like Bluetooth) where the patient's smartphone loaded with BitMint digital money is sending over money bits, against which the locked box drops the daily pills. The BitMint app on the phone will only send over bit money that satisfy the timing requirements written into it, and the box for its part will only accept digital money that comes with terms proper for the release of the drugs at that moment. A monthly visit will replace the box, or the patient will carry the locked box to exchange it with a new one. The money accumulated in the box will either be communicated through the air (e.g. 4G) to a central money register, or be stored in the box and drained from it when it is retrieved empty of pills from the patient. The pay-per-pill drug-dispensing app will alert the patient if the daily pills have not been purchased. It might also alert the physician of record. The locked box might also be on guard for any deviation from the regimen, and respond according to a pre-programmed algorithm.

BitMint Frictionless Payment

BitMint money system and payment protocols are hinged on the notion of frictionless payment. Money is valuable in motion, in transfer. Payment gives money its value and its service. This act of payment must be clean, and unencumbered to the highest degree. At the same time it should be clear, unambiguous, doubt-free, also without reservations. To accomplish that it is necessary to separate the act of payment from any other concerns, especially security and fraud. Such concerns will be accommodated around and on top of the basic frictionless act of payment. BitMint payment is believed to be the ultimate simplicity in actualizing the act of payment where a coin of any desired value is passed from payer to payee. When the payee gets possession of the coin the act of payment has been completed. The term 'coin' is used here to highlight the fact that payment in its essence is a transfer of an identity-specific item of a specific value, from payer to payee. These two parameters are essential for the act of payment to be happening. The notion of a coin reflects this combination. A coin is a distinct item, distinguished from all other coins of same or different denomination, and an item that is clearly marked as to the value to it represents. BitMint is the ultimate mathematical simplicity of making a payment. When a BitMint bit string is communicated from payer to payee, the transaction is done.

The BitMint bit-wise coin payment is a strict analog to passing a physical coin. When a payer hands over a physical coin to the payee, there is no intrinsic need for mutual identification. Two complete strangers may exchange money. Alas, all the prevailing payment mechanisms involve intrinsically an identification of both payer and payee, either explicitly or implicitly. That is because these are account-based payments. The payment amount is identified via an identity-less figure; so to make the payment stick, the identity of the payer and the payee must be established. This is the source of friction for legacy transactions as well as the common cryptocurrency transactions. BitMint is free of it, and that is why it can be done frictionless, which, in turn, is why the BitMint payment will work for micro and nano payments, however fast they need to happen. BitMint payment is in the form of passing some bits. Upon their passing the payment occurs even if the identities of the payer and payee have not been established.

Because of this utter simplicity of transferring an identity unique, value-specified coin from one to another, it behooves on us to apply this solution to the transfer of anything of any value from one to another. So the term currency used in BitMint descriptions should be extended. The extension applies first to items of values that are readily exchanged with each other at some established exchange rate, (say a dollar v. Yuan, or Euro v. Gold), then extended to items of values that are not readily interchanged, like dollar, and access-privileges, or stock v. priority status for a medical procedure, like an organ transfer, etc. Next the term currency may be extended to items of very transient value, like discounts, ephemeral coupons. Currencies may also be taken in a negative notion of obligation, and hence the BitMint machinery can be used to manage credit and risk. Once the payment per se has been stripped to bare bones, one has to mind the issue of trust and security. With BitMint such issues will be dressed upon the essential payment. The trust and security for BitMint payment has four categories:

Zero Trust Verification
Side Trust Fund
Behavioral Trust Index
Insurance
Elaborated on below:

Zero Trust Verification: when two mutually mistrustful strangers exercise a payment, the payee will not consider the payment done until she cleared the paid money with BitMint, and likely have been given a freshly minted money string in the same amount (replacing the presented string). This works like credit card payments today. The payment is verified by the network, who then assumes responsibility for the payment amount. BitMint zero trust verification has a fundamental advantage over similar verification for other payment systems. The BitMint system allows for delegation of verification authority, so that a transaction may be verified by a near-by local verification center.

Side Trust Fund. This solution calls for all the traders to deposit with the mint a reservoir sum, Z, which is significantly larger than the maximum transactional threshold H (Z>H). These reservoirs will allow the traders to transact within this closed environment without verifying each transaction with BitMint. Instead every payee will insist on receiving a cryptographically robust identification data for the identity of the payer. Every so often each trader will convey the accumulating money paid to BitMint for verification. If any payment does not pass the verification, then the trading license to the apparently fraudulent trader will be revoked and the defrauded trader will be paid from the reservoir of the fraudster. The timing for the aggregate reporting has to be adjusted to prevent a trader from launching a massive fraud with many traders before he is caught. One may recall that to pay with counterfeit money is considered a serious felony, which is an effective deterrent especially for smaller sums.

Behavioral Trust Index: traders develop a history of behavior with the mint. As they do so, the mint will issue to them a trust index that increases in value the longer the trader has well behaved both time wise, and transaction volume wise. It takes a while to build a trust index. Each trader will be able to present his trust index in a cryptographic form that would assuage the payee that no fraud is involved (e.g. using public/private key technology). The payee may decide that for a high enough trust index, and a low enough sum of payment, the risk of accepting the payment without real time verification from BitMint is well worth it. Anyone abusing the trust index will lose it right away, and may be denied another index for life, or for a long time. The convenience of payment without waiting for verification will be prized by all traders, and they would not opt to lose it. Merchants might let payers without a trust index wait in a different line, and impose other inconveniences.

Insurance: this payment trust challenge gives rise to a classical insurance opportunity. Merchants and other payees may buy insurance that would say that if the payee accepted payment of sum Z from a payer that has presented a trust index of I, and it was eventually found out to be a fraud then the insurance will compensate the payee. This shifts the risk from each payee to the insurance company. Insurers will be able to offer their own trust indices to traders, and then insure traders who accept payment from a payer with an insurance issued index. The field is rich with opportunity. The important point here is that the question of payment fraud is not impacting the payment solution itself which is kept at its mathematical minimum, and lends itself to building upon it rich value transfers configurations.

Figure 1:
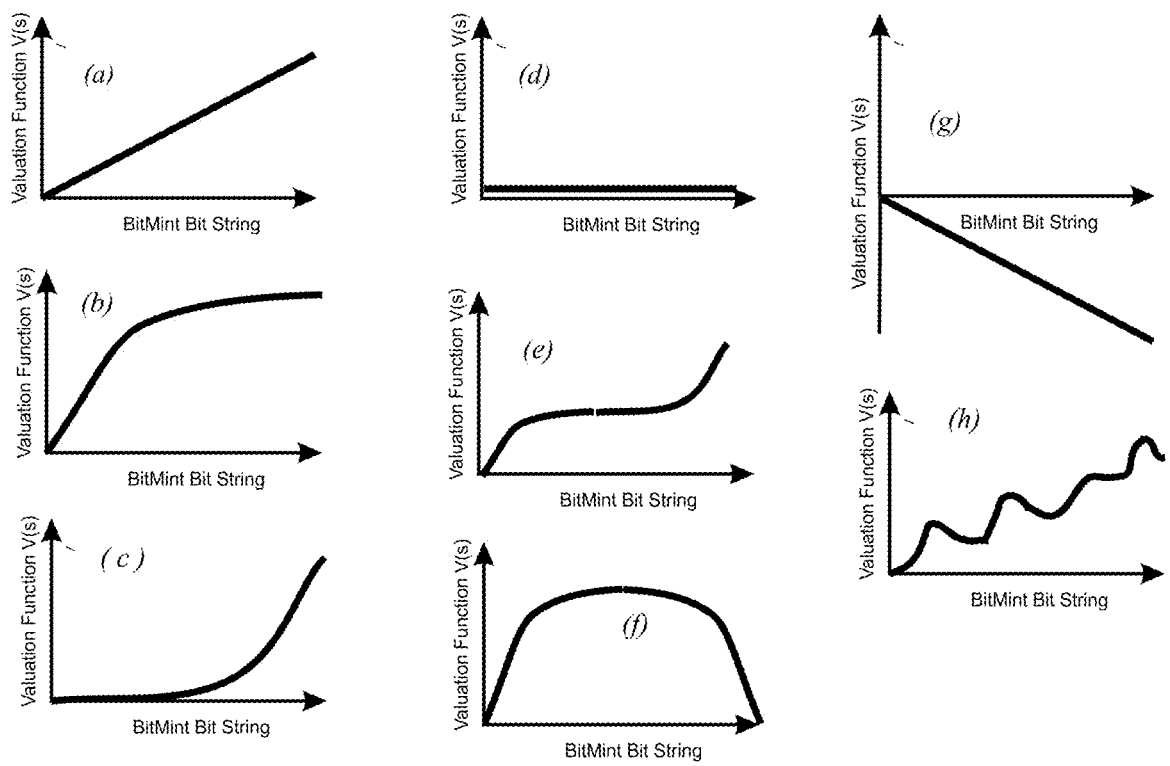
FIG. 1: BitMint Valuation Function This figure illustrates eight different functions. Each function is depicted on a graph where the horizontal axis marks the ordered bits of a string S comprised of s=|S| bits listed from left to right, and the vertical line represents the monetary value identified for various substrings of S, V(i) for i=1,2, . . . s Each point on the graph, V(i) with horizontal value i and vertical value V(i), reflects the value of a substring of S defined as the ordered bits from bit one to bit i. The value of a substring that stretches from bit i to but j is given by V(j)–V(i–1). The figure depicts the following cases.

Case (a) is the simple function where each bit in the BitMint bit string contributes the same monetary value, and hence the value of a string is proportional to the number of bits it contains. The respective valuation function is a straight upward line starting at the origin. The greater the slope, the greater the value contribution of each bit. A string T of t bits somewhere in the stretch of |S| bits of the coin string S will be of same value regardless of which t-size segment of S is being marked for T. Case (b) depicts an "early steep" function where the first bits (counting left to right) value high, up to a point i where the value tapers off. A fixed size string T marked at the beginning area of S will have a larger value than a same size string T marked further to the right of S. This allows one to adjust string size to payment sum. Small payments may be cut out from the right area of S where each bit is valued less and large payments may be cut out from the left area of S where each bit is valued more. Case (c): This is the opposite of case (b), the left side bits have a smaller value and the bits near the end of the string have an increasingly higher value. Case (d): this is the zero value case, where the bits carry no value, and their transfer constitutes a zero payment. The value of such a payment is for accounting, activity tracking and testing a real payment system. Case (e) This case is a combination of cases (b) (c), and (d) where the BitMint valuation function changes in per bit valuation from high value to lower value to zero value, and then it rises again, low level then high level (steep curve). Case (f): this case introduces the negative bit concept. A bit associated with a negative value represents a monetary obligation rather than a monetary asset. The absolute value of the bit valuation function reflects the measure of the obligation associated with the bit. The picture shows a coin S where the first bits thereof represent value, and the latter bits represent obligation such that the total value of the S string, the coin, is zero. Obligation like assets may be untethered or may be tethered. An untethered obligation is a due obligation, a tethered obligation may be effective at some later date, or contingent upon some future event. Passing a coin like (f) is a zero payment transaction because the assets and the obligations cancel out. The owner of such a coin could make regular payments by passing on substrings of S from the left side of S where the bits carry a positive valuation, or she could be paid by passing on bits from the obligation zone of S. This would amount to passing the obligation to another party, presumably in some fair trade where the coin owner transfers something of value to the party that agrees to assume the obligation entailed in the right side of S. Case (g): This coin depicts a negatively valued BitMint coin, namely a statement of obligation. The holder of this coin is associated with an obligation to pay. The payment may or may not be tethered to any terms of repayment. In the depicted case each bit in S contributes the same measure to the coin's obligation. Hence the holder could pass along any substring T∈S, from any section of S, and the value would be the same. This case is the symmetric opposite of case (a). One reflects cash and the other liability. Case (h): This case depicts a general valuation function with positive parts and negative parts all in one coin.

Figure 2:
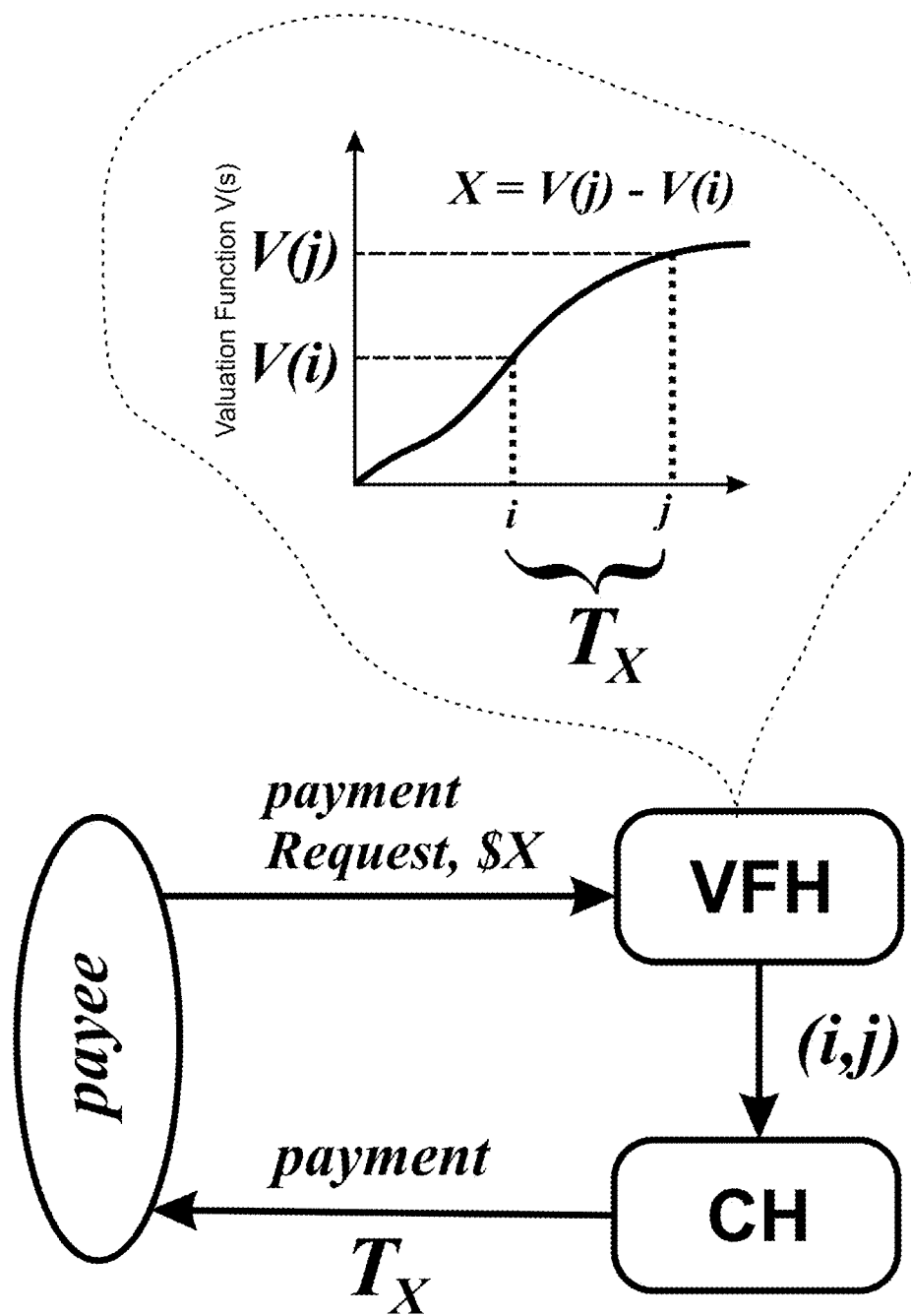

FIG. 2: BitMint Payment Configuration Valuation Function Holder and Coin Holder: This figure depicts the separation option between the entity that holds the coin, the "coin holder" (CH) and the entity that holds the valuation function, the "Valuation Function Holder" (VFH). Payment can be exercised such that the CH is not aware of the valuation of the coin under consideration, while the VFH is not aware of identity, or the bit pattern of the coin. Together they accomplish the payment. The figure shows a payment request of $X coming from a prospective payee. The request is handled by the VFH who decides on fulfilling the payment request by identifying a substring T of the coin string S. The VFH defines T by its initial bit, bit i, and its terminal bit, bit j. The identities of i and j are then communicated from the VFH to the CH. The CH, for its part may be clueless as to the value of S or the value of the payment substring T. CH only knows the values of i and j, and it cuts the T substring from i to j, erases it from its possession or marks it as paid, and delivers the actual string to the requesting payee. The transaction is thereby complete. The figure also shows the valuation function held by the VFH and how T is defined over it.

Figure 3:
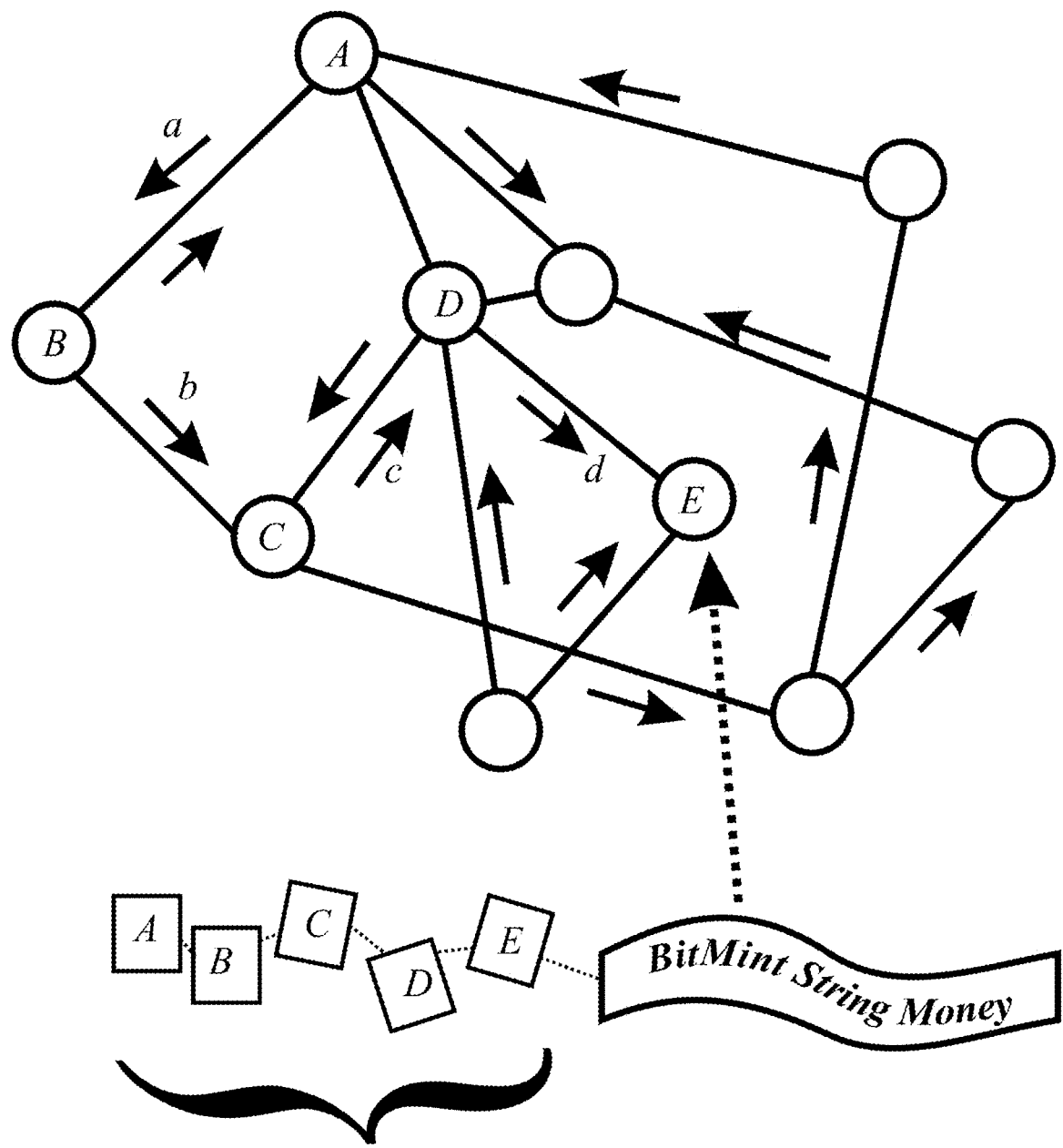

FIG. 3: Mutual Service: BitMint Payment Accounting This figure depicts a situation where a large number of interrelated items provide and consume services and products from each other. The items may be players in a regular human economy, or they can be computing devices in a large communication network. Such an environment may act in apparent chaos and unpredictability, some services are in high demand and short supply, other are in low demand and large supply. There is a great deal of inefficiency in such a system, and therefore there is a great need to (i) study it, and (ii) regulate it. Both objectives may be fulfilled with the help of a payment system where every service is paid for. Payment may be carried out with low value coins, or even zero level coins, where the objective is not the transfer of wealth and assets but to monitor the dynamics within the network. However, in order to regulate the system there must be a good pricing strategy that would incentivize the generations of desired, in demand, products or services, and reduce bottlenecks. Dynamic pricing, will do that. Normal natural regulation of supply and demand will optimize the system and will serve as the justification for this payment regimen. One may note that the monitored and/or regulated payment dynamics may be comprised of assets and liabilities, cash and obligations. The history of the payment reality within such a network may be captured by the increasing size trail that follows the BitMint digital coin. In the depiction, item or node A makes a BitMint payment (a) to node B—in a form of a bit string. At some point of time later B makes a b payment to C, where b is part of the a payment made by A to B. C at some point cuts the coin b and conveys part thereof, c, to node D which then passes a part or whole of it to E. The figure shows how the coin held by E which is part of the original coin a sent from A to B, is being trailed by meta data that identifies the full fledged chain of custody. Who owned that segment of the coin at which time interval.

Figure 4:
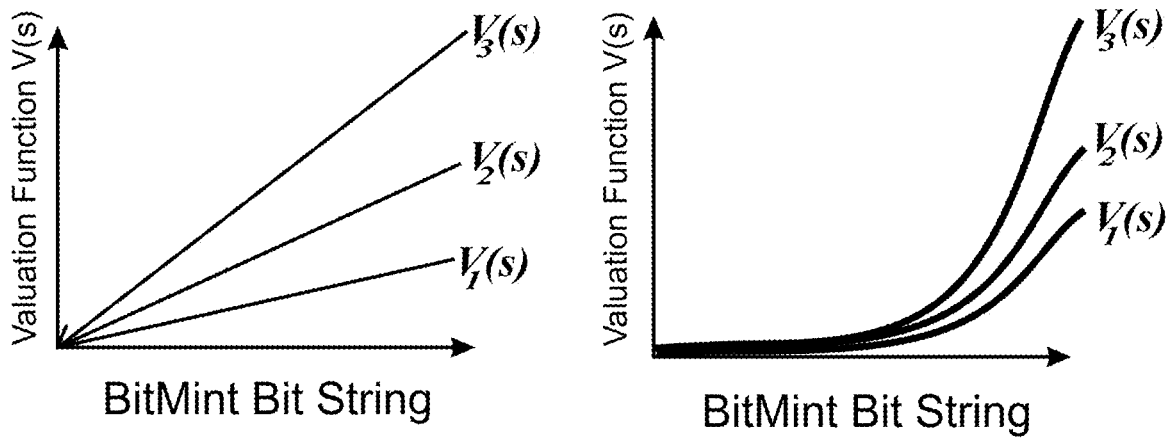

FIG. 4: Superposition of BitMint Valuation Functions This figure shows a BitMint coin associated with several valuation functions in a "parallel" format, namely for each valuation function the relationship between valuation of a bit to its previous bit is the same. On the left side the three valuation functions shown are 'simple' in the sense that each bit has the same value as the previous one. But different valuation functions have different values. These distinct valuation functions may indicate interchangeable commodities, or non-interchangeable commodities, in which case this arrangement makes more sense. The right side of the figure shows "late steep" valuation functions in parallel form. Each valuation function follows a similar pattern, but they have different valuation values for each bit.

Figure 5:
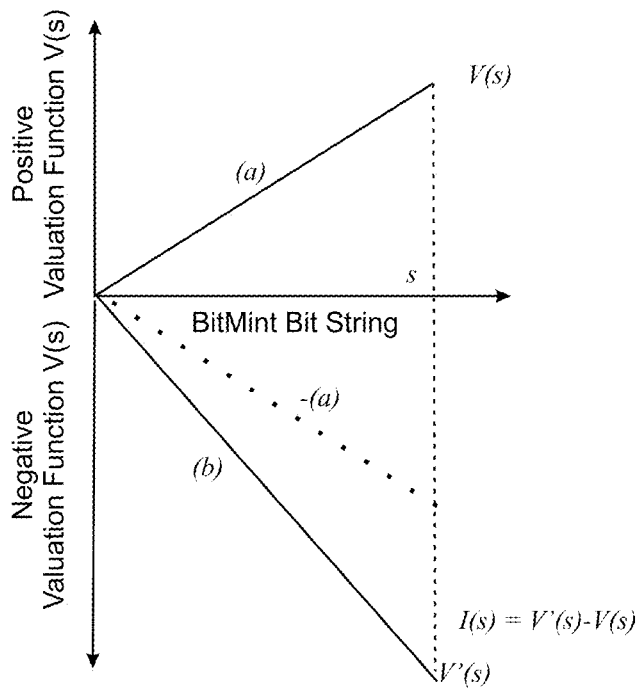

FIG. 5: BitMint Coin Superpositioned with Positive and Negative Values This figure depicts the concept of double valuation of the bits of a BitMint coin. Each bit i has a positive value v(i), and a cumulative value $V(i)=\Sigma v(j)$ for $j=1,2,\ldots i$. But it also is associated with a negative valuation function which signifies obligation: v'(i) and a similar cumulative negative valuation function $V'(i)=\Sigma v'(j)$ for $j=2,3,\ldots i$. The figure shows both V(i) from i=1 to i=s, line (a), and the negative valuation function V'(i) from i=1 to i=s, line (b). The figure also shows line −(a), which is the mirror image of line (a). The gap between this mirror line (−(a)), and line (b) reflects the edge of the obligation value over the asset value. This is a typical situation for a loan. V(i) reflects the value of the loan expressed by the size of the substring 1 - - - i, and V'(i) reflects the value of the corresponding obligation, typically the amount of the loan plus some interest. The meta data of the coin will identify the terms under which the V'(i) obligation has to be satisfied.

Figure 6:
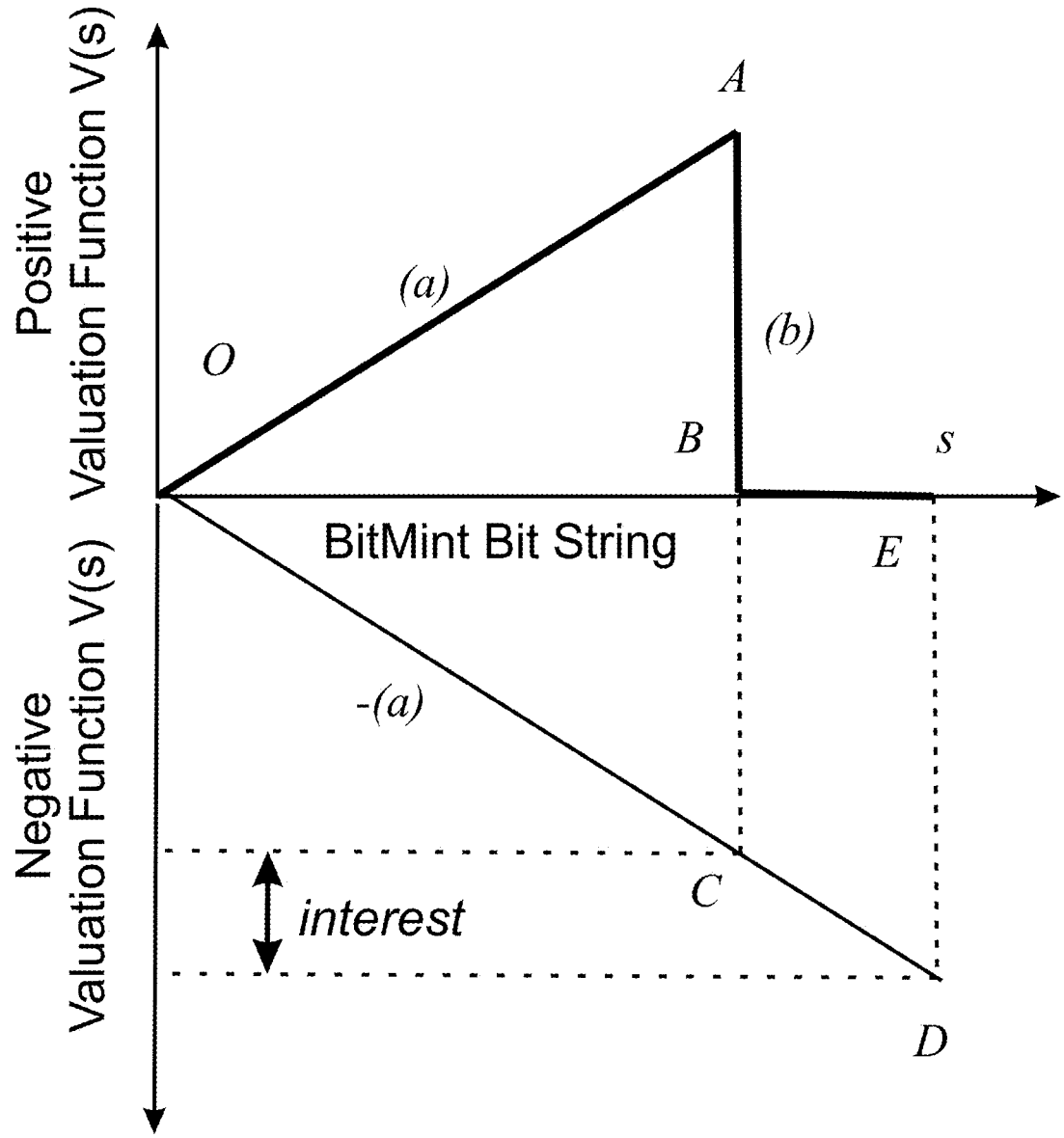

FIG. 6: BitMint coin superposition with a Positive, Zero and Negative Values This figure shows positive, negative and zero value bits within a single BitMint coin. It reflects a loan situation where the owner can make payments from this coin by cutting off substrings where the obligation matches the cash, while keeping the extra obligation burden to himself. Line (a) represents the BitMint simple positive valuation function. The valuation at point A reflects the full positive valuation of the coin, as expressed with the substring T of the coin S: |T|=|OB|. This substring carries assets and obligation in equal amount. It is so indicated by having the obligation valuation line shown as the mirror image of the positive valuation function. –(a) is the mirror of (a). Or say |OC| is the mirror image of |OA|. The remaining part of the coin, shown as section |BE| has no positive valuation, only negative valuation. It reflects the interest on the loan, which comes with repayment terms identified within the coin meta data. That interest is depicted as the vertical gap between points C and D. The section |BE| looks flat from a positive valuation view.

Figure 7:
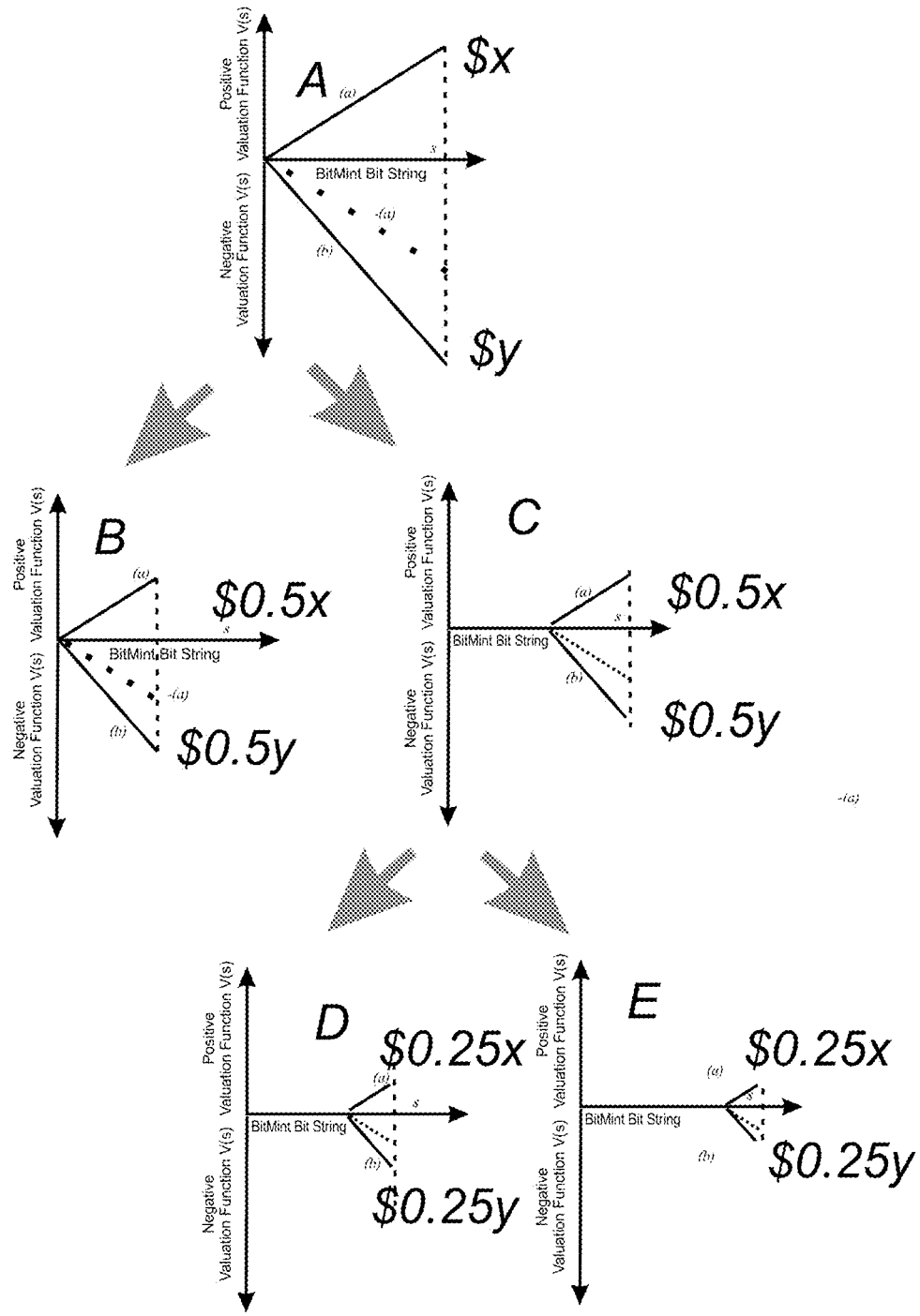

FIG. 7: Credit and Cash Cascade This figure shows cash and credit cascading. The top of the figure shows trader A and her coin, which is comprised of positive valuation of $x, and a negative valuation (obligation) of $y, like in a typical loan. That coin is represented by a bit string S comprised of s bits. A could then divide her coin in some way and pass each part to a different trader. The figure shows an equal division. The first (leftmost) s/2 bits are paid to trader B, and the second (rightmost) s/2 bits are paid to trader C. Since both the positive and the negative valuation functions are linear (each bit is worth the same as all others, both for positive and for negative evaluation), such division equally divides both the assets and the obligation. At this point both trader B and trader C have in their disposal a coin which is a cut from A's coin. This implies that traders B and C, now each owes to A $0.5y payable according to the terms specified in the coin. A still has its obligation towards whomever gave her the coin in the first place. In other words, A has cascaded down the obligation, passed it on to other traders. Same with the asset. The figure further shows how trader C divides its coin to two parts, passing each part to another trader: the asset and the obligation. Traders D and E each now holds a coin that carries $0.25x each and carries an obligation in the sum of $0.25y. D, or E or both can continue this cascading further. Note that when A split the coin S, it passed the leftmost 0.5s bits to B and the rightmost 0.5s bits to C. These bits carry both the positive and the negative valuation function. When trader C passed part of its coin to traders D and E, then D got the third quarter of the coin S (counting left to write) and E receive the 4th quarter of the same coin.

In practice any "parent node" in this cascade might impose a mark-up of the obligation, which would garner some profit to this node. Otherwise the entire paid obligation will be passed upwards.

FIG. 8: Coin Exchange: Double Valuation to Single Valuation This figure depicts how a coin with double valuation: asset plus obligation is exchanged to two coins with single valuation each: One with a positive valuation and one with a negative valuation. Coin A reflects cash in the amount $X>0 and liability in the amount $Y<0. The trader may exchange coin A for two coins B and C where coin B is single valued for the amount $X, and coin C is single-valued for the obligation $Y. Coin B can be spent, paid, right away to any other traders, while coin C comes due at time point t as specified in the meta data of the coin. Subject to this obligation, coin C may be traded within the community of traders.

Figure 9:
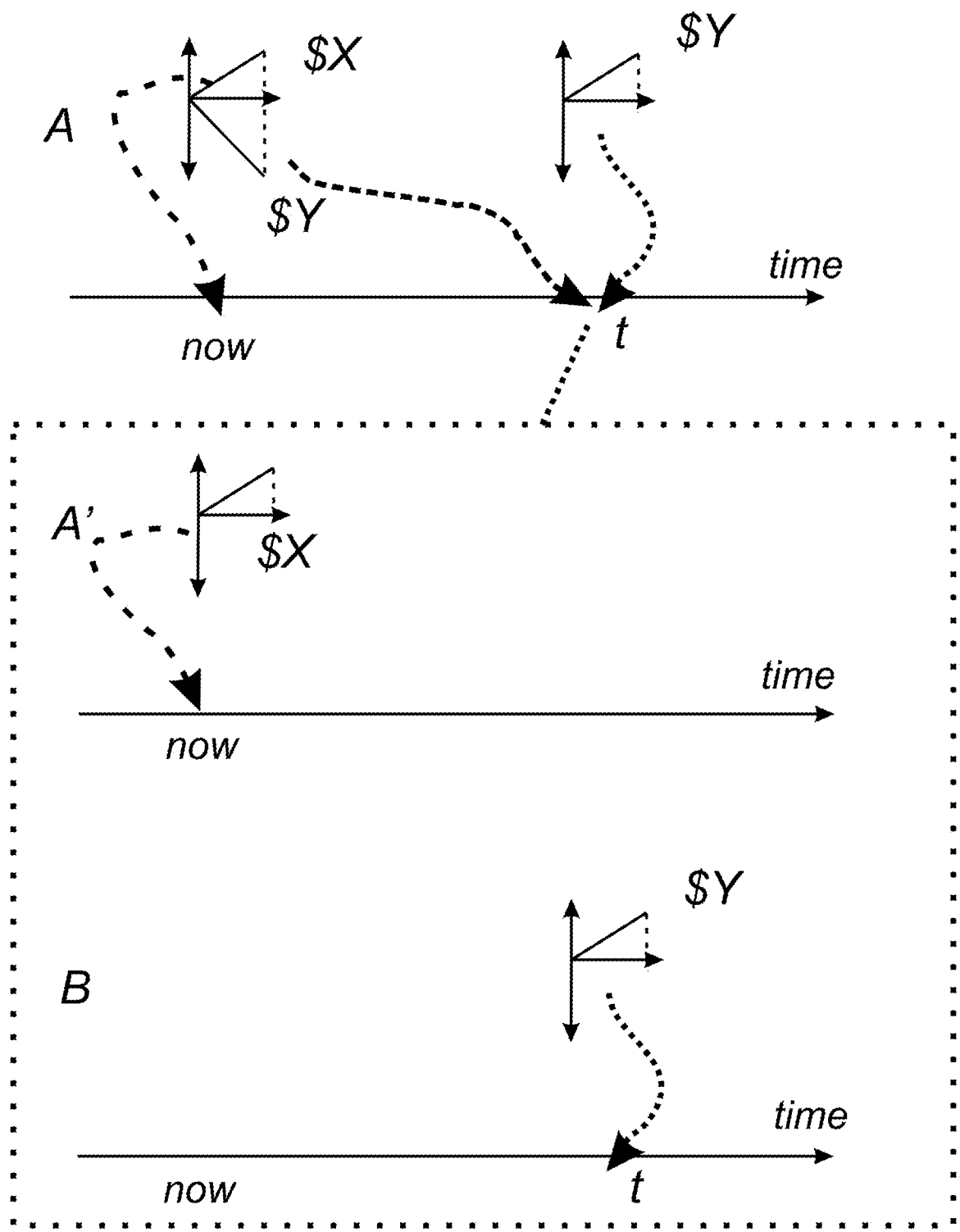

FIG. 9: Positive and Negative Valuation Exchange This figure depicts the process of swapping credit with cash. It shows trader A in possession of two coins. One coin is double valued: $X>0 cash, and $Y<0 liability (obligation). The other coin is a cash coin with $Y tethered to a use date. The money cannot be paid, or used before time point t. Time point t is also the due date for the negative valuation of $Y of the first coin. The cash in the first coin is available immediately. The trader who owns these two coins may exchange them as follows. Let B be the trader who claims the $Y liability that is indicated in the coin held by A. A would exchange through the mint its double-valuation coin with a single valuation coin for $X, this cash is available immediately, plus a new coin, that is also single valued as positive cash in the amount of $Y, only that that coin is passed on to trader B. Trader A swapped the cash coin in its possession against wiping out its negative valuation of the first coin. Trader B loses the hold on trader A for the $Y obligation indicated in the coin, and in return trader B now holds positive cash which is available for use at point t. This swap introduced no change in the holding and liabilities of either trader. It simply swaps risk, and generates convenience, and of course a record is kept of what had been done.

Figure 10:

FIG. 10: Drug Authentication: The picture depicts pills spilling out of a prescription bottle where a patient's phone takes a picture of them. The pills are marked with a unique entropic message (see appendix) and the app on the phone compares the entropic message on the pills to what is expected from the genuine manufacturer, to ascertain that the drugs are authentic. Critical for online orders.

Figure 11:
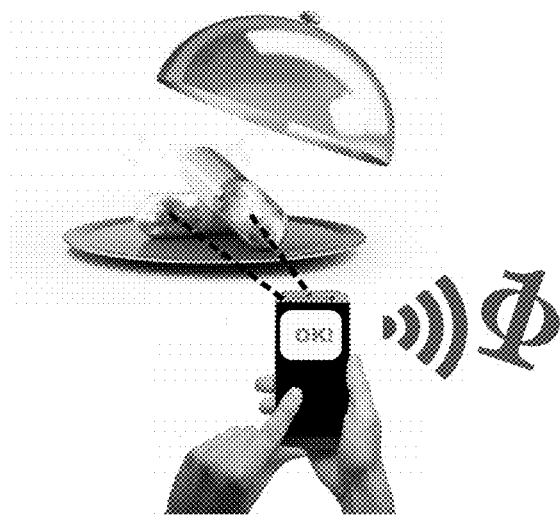

FIG. 11: Nurse Verifies Patient's Pills (and pays for them) via Patient's phone: The picture shows the tray the nurse prepared for a hospitalized patient. It also shows her taking the patient's hospital phone to read the entropic message on the pills (see appendix), verifying that there is no error, and then pressing a payment button to pay for the two pills to be consumed at the moment. The payment is through BitMint tethered money that can only be used for these two pills at this particular time. If that money is not spent it indicates that the patient has not taken her medicine.

Figure 12:
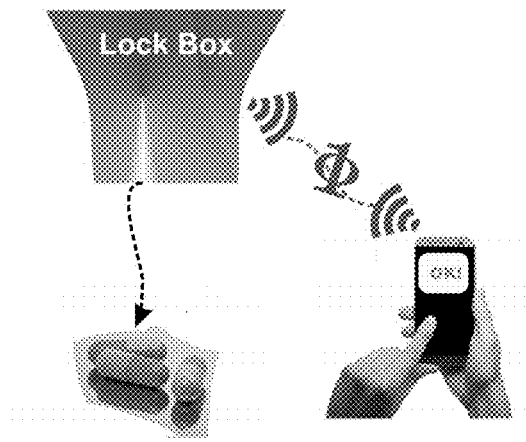

FIG. 12 Patient pays for daily pills and gets them: This figures shows a medicine lock box that releases the pills needed to be consumed at this moment by a patient taking the pills at home. The pills are released only after the patient pays for them. The payment is tethered to the time these pills are to be taken. That digital money is not transactable before or after. See appendix.

Figure 13:
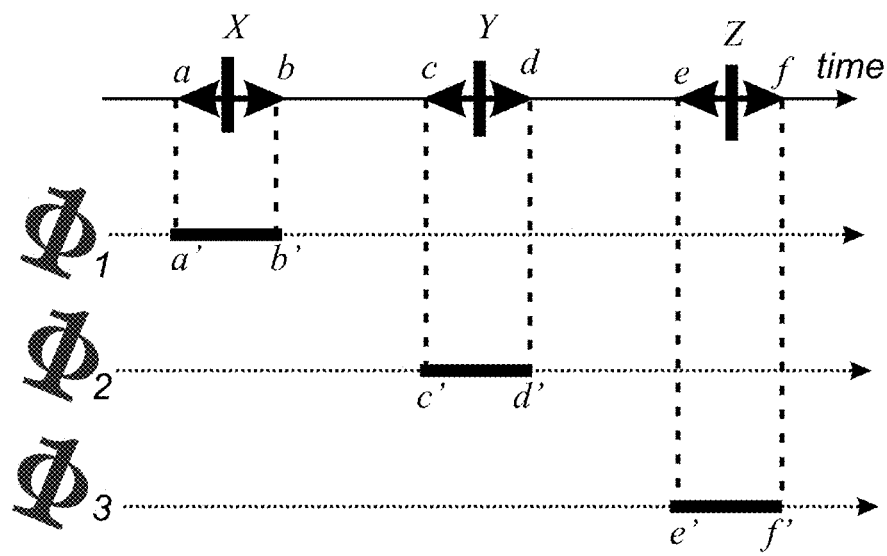

FIG. 13: Pay-per-Pill helps Patients take their Prescription drugs on time: This figure shows three digital coins $\Phi 1$, $\Phi 2$, $\Phi 3$, stored in the patient's phone. The figure also shows that at time points X, Y and Z the patient is scheduled to take a pill. At time interval a-b (some time before time point X and some time after), coin $\Phi 1$, is eligible for redemption (payment). It cannot be used at any time before point a or at any time after point b. The phone also stores digital coin $\Phi 2$, which can be used only between time point c and time point d (around the scheduled time for the $2^{nd}$ pill, Y). The figure then shows $\Phi 3$, which is 'live' and usable between time point e and f only—around the scheduled time for the third pill, Z. The phone stores these tethered coins for all the scheduled pills. If a coin is not used properly the phone reports to the health care center, and alerts the patient. This per-pill-payment helps secure the administration of prescription drugs, and helps with the accounting burden. See appendix.

FIG. 14: Patient Pays per Pill, Nurses Save Work, Reduces Errors: This figure depicts a nurse approaching a hospitalized patient with her cart. The cart identifies the patient via her phone or smart device that cannot be moved from the bed, to prevent errors. Once the patient is identified, the computer on the cart identifies the pills needed at that time, and connects to the patient smart device to get paid for these pills. Once the pills are paid for, they are dispensed from a department-wide dispenser that houses all the prescription drugs needed by all patients in the department. The nurse saves the work of preparing a tray for each patient, several times a day. This reduces errors. Since pay-per-pill is activated there are no subsequent bills or invoices, no argument about the veracity of the invoice. And of course the record of the digital payment allows for future examination of proper dispensation of the prescribe drugs.

FIG. 15: qbit—real and simulated: The figures shows the difference between the full qbit mode and the simulated qbit mode where the bit identity is resolved upon minting.

FIG. 16: Splitting a BitMint Coin: The figure shows how a coin is divided to three parts when a middle sub-string is identified along with the previous and subsequent strings.

FIG. 17: Anatomy of an fbit: the figure shows a coin comprised of fbits divided to identity bits, counter bits, pointer bits and value bits.

FIG. 18: BitMint coin structure: the figure shows the data elements of the BitMint coin.

FIG. 19: BitMint Redemption Dynamics: figure shows how the various data elements in the coin contribute to the coin redemption decision.

FIG. 20: owner identification options: the figure shows how the coin metadata carried biological information of its owner to build security.

FIG. 21: coin custodian history: figures shows how the coin metadata carries the ownership history of the coin.

FIG. 22: BitMint network Nodes confirm BitMint Transactions: figure shows the coin trajectory from minting to redemption where the ownership exchange is confirmed by other traders.

FIG. 23: layered security for coin history: the figure shows how successive records of coin history are linked cryptographically to build a trusted record.

FIG. 24: Tracking BitMint Split Coins: the figure shows how the coin attributes migrate to all the splits of a coin.

FIG. 25: frictionless payment: the figure shows how BitMint money pays continuously from one chip (payer) to another (payee), utilizing the very form of BitMint money.

FIG. 26: time dynamics of coin authentication: figures the relationship between a tentative confirmation to a firm confirmation.

FIG. 27: Coin conjugate database stops delegation fraud: the figure shows how the BitMint hierarchy delegates authority downward, and how payment confirmation climbs up through the same hierarchy.

FIG. 28: dynamic comparison between cash and BitMint coins: the figure shows how BitMint coin changes many hands, relative to some national currency (e.g. Chinese Yuan) that backs it up, that stays at the mint's account throughout the transaction.

FIG. 29: f-split of BitMint coin. The figure shows how a coin identified through an fbit distance matrix is split into two subcoins each holds mutual distances for the fbits claimed by it. Dark circles represent fbits, the lines between them represent distance values. White circles represent fbits with a zero valuation function. The figure shows that with v-split all the fbit information is carried by both splits, including all the distance values, only that the sum valuation of the fbits in the two splits equals the valuation of that fbit in the pre-split coin.

FIG. 30 joining of BitMint coins: the figure shows how coins are joined, whereby new distance values are created to connect all the fbits to each others. When the joining involves coins which were previously v-split then the fbits with zero valuation need not be distance-connected to the other fbits.

SUMMARY NOTES

This invention presents a primary method for minting digital coins as a digital expression representing a collection of well-ordered financial bits, (fbits), viewed as claim checks for a public commodity which is in the form of a fiat currency, gold, or silver, or any other tradable entity; the minted coin digital expression includes meta-data that specified the attributes of the mint, time of minting, identification-label of the coin, and the meta data further specifies the conditions that must be met for the coin to be redeemed ('terms of redemption'); each fbit may be comprised of data reflecting attributes, and it does include a number of bits, regarded as the 'fbit payload', such that the identity of the payload bits does not express any information regarding the value of the fbit; it only defines the identity of the fbit, for which the probability of guessing is $1/2^n$, for the n bits of the payload, as these identities are selected ad-hoc by a source of high-quality randomness; each fbit is assigned a valuation function specified in the coin meta data and defines the value of the fbit; the value of the coin is the sum values of the coin's fbits.

The primary method is further defined wherein a coin may be split to two sub-coins, where the fbits in the pre-split coin are divided between the two splits; the terms of redemptions are inherited by the two split coins, the value of each split coin is the sum valuations of its fbits.

The primary method is further defined wherein a coin may be split to two sub-coins where the valuation function for each fbit, v(fbit), is divided to one valuation function $v_1$(fbit) that is associated with the first split of the coin (split-1) and another valuation function $v_2$(fbit) that is associated with the second split of the coin, such that $v(fbit)=v_1(fbit)+v_2(fbit)$ for every fbit in the coins; the valuation functions for each fbit for each split are written into the meta data of each split; the terms of redemptions are inherited by the two split coins. The primary method is further defined wherein the fbits are mutually defined through a set of distinct $0.5n(n-1)$ positive integers indicating distance values between the n fbits of a coin, such that the fbits are not in any pre-set sequence, but each fbit can be specified via the set of its distances to all other (n−1) fbits; the distance values are written in the meta data of the coin.

The primary method is further defined wherein two coins $C_1$, and $C_2$, comprising $n_1$ fbits and $n_2$ bits respectively can be joined to a joint coin $C_j$, the value of which is the added values of $C_1$ and $C_2$, by adding $n_1*n_2$ distances between each of $n_1$ fbits to each of the $n_2$ fbits, and by logically creating a union of the terms of redemptions for $C_1$ and $C_2$ The primary method is further defined wherein the fbits have no attributes data, and are comprised only of n payload bits each, the identity of which is randomly selected by the mint and does not reflect value of the fbits only identity of the fbits; such fbits are concatenated to a composite string, and identified by their location in the composite string. The primary method is still further defined wherein the fbits in the coins have a negative valuation, and in order to redeem these coins, their holder has to pay their denominated value to the mint; or the holder may pass such negative coin to another trader and pay, or give a value equivalent, to that other trader, which is then responsible for the coin redemption; such negative coins may have a redemption date, and serve to manage debt.

The primary method is further defined wherein the financial bits are associated with a valuation function which is dependent on specified future eventualities written in the coin meta data, and in this form such coin can be used as an investment, and risk allocation instrument.

This invention also identifies a system for minting, transacting and redeeming digital coins whereby a central authority issues digital claim checks against which a definite measure of a publicly traded commodity is given to the submitter of the claim check; the system allows for these coins to be traded within a trading community; said coins are assigned with terms of redemptions specified as meta data part of the digital coin, allowing a coin owner who satisfied the terms of redemptions to redeem it, namely claim its denominated value from the mint; and where the coins are comprised of financial bits (fbits); each fbit comprised of meta data and value 'payload bits', which are bits for which the identity has been determined by a randomness source, and for which the identity of the bits does not specify any monetary value; monetary value is determined by a valuation function specified in the meta data; and where the mint keeps a database of all minted coins, indicating status of each coin as fully redeemed, partially redeemed, or not yet redeemed; where partial redemption may be redemption of some not all the fbits, or redemption of part of the value indicated by the valuation function of the partially redeemed fbit.

Glossary: This document describes money in the BitMint format, for which the registered trademark is: $\Phi$. When the digitized currency is ¥ we write $\Phi$(¥), and similarly $\Phi$($), and $\Phi$(€), etc. The trademark will also be represented with standard symbols: $\Phi$ =<01>=<|1> and when representing ¥: $\Phi$(¥)=<0¥1> and similarly $\Phi$($)=<0 $ 1>, and $\Phi$(€)=<0 € 1>. A BitMint coin is comprised of the BitMint money bits (value bits), regarded as 'the payload' and of meta-data, or coin-data, marked as $\Phi$ * or <0|1>*. A BitMint coin will be marked as: [$\Phi$]=$\Phi\Phi$*=<0|1><0|1>* The value bits, the 'payload' is a string of 'financial bits': $\Phi = \varphi_1 \varphi_2 \ldots \varphi_s$ where $\varphi_i$ is financial bit at position i in the money string. i=1,2, . . . s, where s is the number of financial bits that comprise the BitMint coin.

Each financial bit is associated with a value function $v_i = v(\varphi_i)$, and the coin as a whole has a value: $V(\Phi) = \Sigma v(\varphi_i)$ for i=1 to I=s In the simplest implementation of BitMint a financial bit is a nominal bit. The entity that manufactures, mints, the BitMint digital coin is called The Mint. Symbol: The BitMint Mint: {[$\Phi$]}, or {[<0|1>]}. The modules inside the Mint: the Negotiator (N), the Core (C), and the Coin Repository (R) are expressed as {[$\Phi$]N}, {[$\Phi$]C}, {[$\Phi$]R}, respectively. This symbols are used in special coin minting language developed within the BitMint program.

A BitMint Mint serves as a payment authentication center, PAC, using its coin authentication data (CAD). CAD can be modified into CAD* such that the mint can delegate coin authentication function to it to authenticate BitMint payment. Such a delegated entity, (derived entity) will be designated as {[/$\Phi$]}, and if it delegates this authority further, the newly derived entity will be marked as {[//$\Phi$]}, and so on.

What is claimed is:

1. A method to conduct a local digital monetary transaction for value between a payor and a payee without requiring real-time engagement of a public electronic computerized communication network, comprising
installing, on a payor mobile computing device, a mobile payment application comprising a digital wallet for conducting digital payment transactions, wherein the payor is associated with a financial account at a payor financial institution;
connecting, with the payor mobile computing device, via a public electronic communications network, to a third party mint computing device;
transferring, by the payor mobile computing device, via the mobile payment application, from the payor's account at the payor financial institution to the third party mint computing device, a first amount of funds designated in commonly accepted currency;
receiving, by the payor mobile computing device, via the mobile payment application, from the third party mint computing device, a redeemable digital monetary claim check representing the first amount, wherein the digital monetary claim check comprises digital coin expressed as digital coin data formatted according to a digital coin data structure, wherein the digital coin data structure comprises coin meta data and coin value bit strings including bit string meta data, wherein the coin meta data encodes the mint ID, the nominal ID of the coin, and the terms of redemption of the digital monetary claim check, and wherein the coin bit strings encodes the value and identity of the digital monetary claim check; storing, on the payor mobile computing device in a database accessible by the mobile payment application, the digital coin data comprising the digital monetary claim check;
establishing, by the payor mobile computing device, a local connection between the payor mobile computing device and a payee computing device,
transferring, by the payor mobile computing device, via the local connection and the mobile payment application, to the payee computing device, in a mobile financial transaction, at least a portion of the digital coin data of the digital monetary claim check, thereby transferring at least a portion of the digital coin value;
validating, by the payee computing device, based on the coin meta data, the transferred digital coin, wherein the validating comprises determining that the terms of the financial transaction satisfy the terms of redemption of the digital monetary claim check;
storing, by the payee computing device, in a database accessible by the payee computing device, the transferred digital coin received from the payor mobile computing device;
redeeming, by the payee computing device, at least a portion of the transferred digital coin, wherein the redeeming comprises:
establishing, by the payee computing device, an electronic computerized communication connection via a public communications network with the third party mint computing device, the third party mint being responsible for minting the digital coins;
transferring, by the payee computing device, the digital coins to the third party computing device:
determining, by the third party mint computing device, based on the coin bit string and the bit string meta data, the value of the transferred digital coins in commonly acceptable currency;
validating, by the third party mint computing device, the digital coins based on their identity and their terms of redemption, wherein the validation of the digital coins is based on terms of the financial transaction between by payor and the payee; and
transferring, by the third party mint computing device, to the payee computing device, in commonly acceptable currency, the value of the transferred digital coins; wherein the financial transaction may involve cash, credit, debit, or an investment instrument, such that the transacted value, the identity of the digital monetary claim check involved in the financial transaction and its terms of redemption against commonly accepted currency are digitally expressed, in the data structure for the digital coin, wherein the data structure further comprises (i) coin meta data and
(ii) a string of value-carrying digital entities regarded as financial bits ("fbits"), wherein each fbit comprises fbit meta data, fm, and value data, fv, where fv is a string of n bits, having a minimum number of bits to prevent guessing the sequence of the bits and where the value of fv is a function of n, regardless of the {0,1} sequence of the n bits, wherein the count of the n bits defines the value of the digital coin and the sequence of the n bits defines the identity of the digital coin and the sequence is generated by a randomization process, and where the coin meta data, cm, includes a value function, Vf for each fbit in the coin so that the value of each fbit, v(fbit), is determined by its Vf and its fv: v(fbit)=f(Vf, fv), and the terms of redemption for each fbit are written into the fbit meta data, fm, and where the value of the digital coin at time t, $V_{coin}(t)$, is the sum values of the coin fbits which satisfy each fbit redemption terms at time t, as written in the fbit meta data, and subject to satisfying the coin redemption terms which are specified as part of the coin meta data, whereby the value of the coin may be expressed as: $V_{coin}(t)=\Sigma v(fbit)_i(t)$ ... for all the fbits in the coin and wherein the value of each fbit may be positive, zero, or negative, and so the value of the coin at time t, $V_{coin}(t)$ may be:
(i) positive—at which case, upon redemption of the coin at time t, the mint transfers to the redeemer a monetary value of measure $V_{coin}(t)$, or:
(ii) negative—at which case, the mint operates as a debt relieving authority, and upon redemption the redeemer transfers to the mint the negative value of the digital coin, or
(iii) zero—at which case the redemption of the coin results in no monetary transfer between the mint and the redeemer, although some of the coins' fbits may have positive value and others fbits of the coin may have negative values; and where a coin Q of value q at a particular moment in time t will be split to a coin R of value r, and a coin S of value s, wherein q=r+s, by splitting the $f_q$ fbits of coin Q, to $f_r$ fbits contained in coin R, and $f_s$ fbits contained in coin s: $f_q=f_r+f_s$; and where the split coins, R, and S, are each constructed with the same meta data as the pre-split coin Q except that the value functions for the fbits of coin R are written into coin R, and the value functions for the fbits of coin S are written into coin S, and where each split coin can further be split through the same sequence of steps; said split enables a process where part of the digital coin is transferred to a payee, while the balance remains with the payor, and this transaction does not require a third party; it is processed as a direct exchange between payor and payee; and where one or more fbits can be replaced with a digital coin, and the value of this fbit-substitute coin, V(fbit substitute coin), equals the value of the digital coin that is fitted in the coin as an fbit; and where the fbit-replacing digital coin can also be comprised of fbit-replacing digital coins;

the digital coin is passed from a payor's computing device to a payee computing device, using local connection, where the payee accepts the digital coin as valid payment according to the terms of redemption of this digital coin as expressed in the digital coin meta data, and based on the identities of the fbits.

2. The method in claim 1 where the authenticity of the meta data of the digital coin is established via common public cryptography procedures, wherein the meta data is signed by the writer of the meta data, using their private key, and same data is validated by any payee using the public key of the meta data writer.

3. The method of claim 1 wherein a service recipient pays a service provider with the digital coins and where the payor device contains s digital coins where coin i, for i=1,2, ... s specifies in its meta data a payment time interval, $\Delta t_i$, indicating that payment of this coin is only valid if carried out within the specified $\Delta t$ time interval, and where the s time intervals $\Delta t_1, \Delta t_2, \ldots \Delta t_s$ are set to correspond to the time intervals in which the service provider is providing corresponding services to the service recipient, and where upon payment of digital coin i from the payor's device, the service provider provides a service intended for time interval $\Delta t_i$.

4. The method of claim 1 where in case the terms of redemption specify the occurrence of a future event E between time point $t_1$ and time point $t_2$, as condition for redemption at a certain value $V_e$, then this coin is transactable as an instrument of investment and risk, throughout the period prior to time $t_2$.

* * * * *